(12) United States Patent
Nikumb et al.

(10) Patent No.: US 11,256,484 B2
(45) Date of Patent: Feb. 22, 2022

(54) UTILIZING NATURAL LANGUAGE UNDERSTANDING AND MACHINE LEARNING TO GENERATE AN APPLICATION

(71) Applicant: Accenture Global Solutions Limited, Dublin (IE)

(72) Inventors: Pankaj Shrikant Nikumb, Pune (IN); Joel Samuel Kore, Pune (IN); Amritendu Majumdar, Mumbai (IN); Marin Grace Mercylawrence, Bangalore (IN); Shridhar Rajgopalan, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/907,818

(22) Filed: Jun. 22, 2020

(65) Prior Publication Data
US 2021/0397418 A1 Dec. 23, 2021

(51) Int. Cl.
*G06F 8/36* (2018.01)
*G06N 20/00* (2019.01)
(Continued)

(52) U.S. Cl.
CPC .................. *G06F 8/36* (2013.01); *G06F 8/10* (2013.01); *G06F 8/20* (2013.01); *G06F 8/38* (2013.01);
(Continued)

(58) Field of Classification Search
CPC ..... G06N 20/00; G06F 40/205; G06F 40/295; G06F 8/10; G06F 8/20; G06F 8/38; G06F 8/60; G06F 11/3668
(Continued)

(56) References Cited

U.S. PATENT DOCUMENTS 7,089,222 B1 * 8/2006 Lannert .................... G06N 5/04
706/47
7,152,092 B2 * 12/2006 Beams ..................... G09B 5/00
709/204

(Continued)

OTHER PUBLICATIONS

Vázquez-Ingelmo et al, "Automatic generation of software interfaces for supporting decision-making processes. An application of domain engineering and machine learning", ACM, pp. 1-5 (Year: 2019).*

(Continued)

*Primary Examiner* — Anil Khatri
(74) *Attorney, Agent, or Firm* — Harrity & Harrity, LLP

(57) ABSTRACT

A device may receive user input data identifying a canvas, API documents, or tagged assets for an application to be generated, a requirements document for the application, and asset data identifying reusable assets and components for the application. The device may process the user input data, the requirements document, and the asset data, with a first model, to extract entity data and intent classification data. The device may parse the API documents to generate structured data identifying API endpoints, a request API model, and a response API model. The device may process the structured data to generate an API layer. The device may process the canvas to identify UI objects and to map the UI objects to UI elements. The device may generate code for the application based on the asset data, the entity data, the intent classification data, the API layer, and the UI elements.

20 Claims, 20 Drawing Sheets

(51) Int. Cl.
| | |
|---|---|
| *G06F 8/10* | (2018.01) |
| *G06F 8/20* | (2018.01) |
| *G06F 40/205* | (2020.01) |
| *G06F 11/36* | (2006.01) |
| *G06F 8/38* | (2018.01) |
| *G06F 40/295* | (2020.01) |
| *G06F 8/60* | (2018.01) |

(52) U.S. Cl.
CPC ............ *G06F 8/60* (2013.01); *G06F 11/3668* (2013.01); *G06F 40/205* (2020.01); *G06F 40/295* (2020.01); *G06N 20/00* (2019.01)

(58) Field of Classification Search
USPC .............. 717/105–116, 140–143; 706/43–48
See application file for complete search history.

(56) References Cited

U.S. PATENT DOCUMENTS

| | | | | |
|---|---|---|---|---|
| 7,769,705 | B1* | 8/2010 | Luechtefeld | G06Q 10/06 706/47 |
| 8,015,143 | B2* | 9/2011 | Estes | G06F 16/2425 706/52 |
| 8,521,675 | B2* | 8/2013 | Boyle | G06F 40/58 706/45 |
| 8,677,377 | B2* | 3/2014 | Cheyer | G06N 7/005 719/310 |
| 9,369,410 | B2* | 6/2016 | Capper | H04L 51/02 |
| 10,460,215 | B2* | 10/2019 | Herold | G01S 13/726 |
| 10,496,905 | B2* | 12/2019 | Solomon | G06K 9/00 |
| 10,515,155 | B2* | 12/2019 | Bachrach | G06N 3/0454 |
| 10,629,191 | B1* | 4/2020 | Cheng | G06F 16/90332 |
| 10,713,317 | B2* | 7/2020 | Krishnamurthy | G06F 40/35 |
| 10,747,823 | B1* | 8/2020 | Birnbaum | G06F 16/3329 |
| 10,929,485 | B1* | 2/2021 | Chew | G06F 16/9038 |
| 10,978,056 | B1* | 4/2021 | Challa | G06F 40/56 |
| 11,132,510 | B2* | 9/2021 | Ploennigs | G06N 5/02 |

OTHER PUBLICATIONS

Wan et al, "How does Machine Learning Change Software Development Practices", IEEE, pp. 1-15 (Year: 2019).*
Zhang , "Machine Learning in Value-Based Software Test Data Generation", IEEE, pp. 1-5 (Year: 2006).*
Langley et al, "Applications of Machine Learning and Rule Induction", ACM, pp. 55-64 (Year: 1995).*
Dewey et al, "Predictive Performance of Machine Learning Algorithms Trained with Sparse Data", IEEE, pp. 1-7 (Year: 2121).*
Toussaint et al, "Machine Learning Systems in the IoT: Trustworthiness Trade-offs for Edge Intelligence", IEEE, pp. 177-184 (Year: 2020).*
Zhender et al, "Modeling Self-Service Machine-Learning Agents for Distributed Stream Processing", IEEE, pp. 2203-2212 (Year: 2017).*
Hewett, "Learning from Software Reuse Experience", IEEE, pp. 386-395 (Year: 2005).*

* cited by examiner

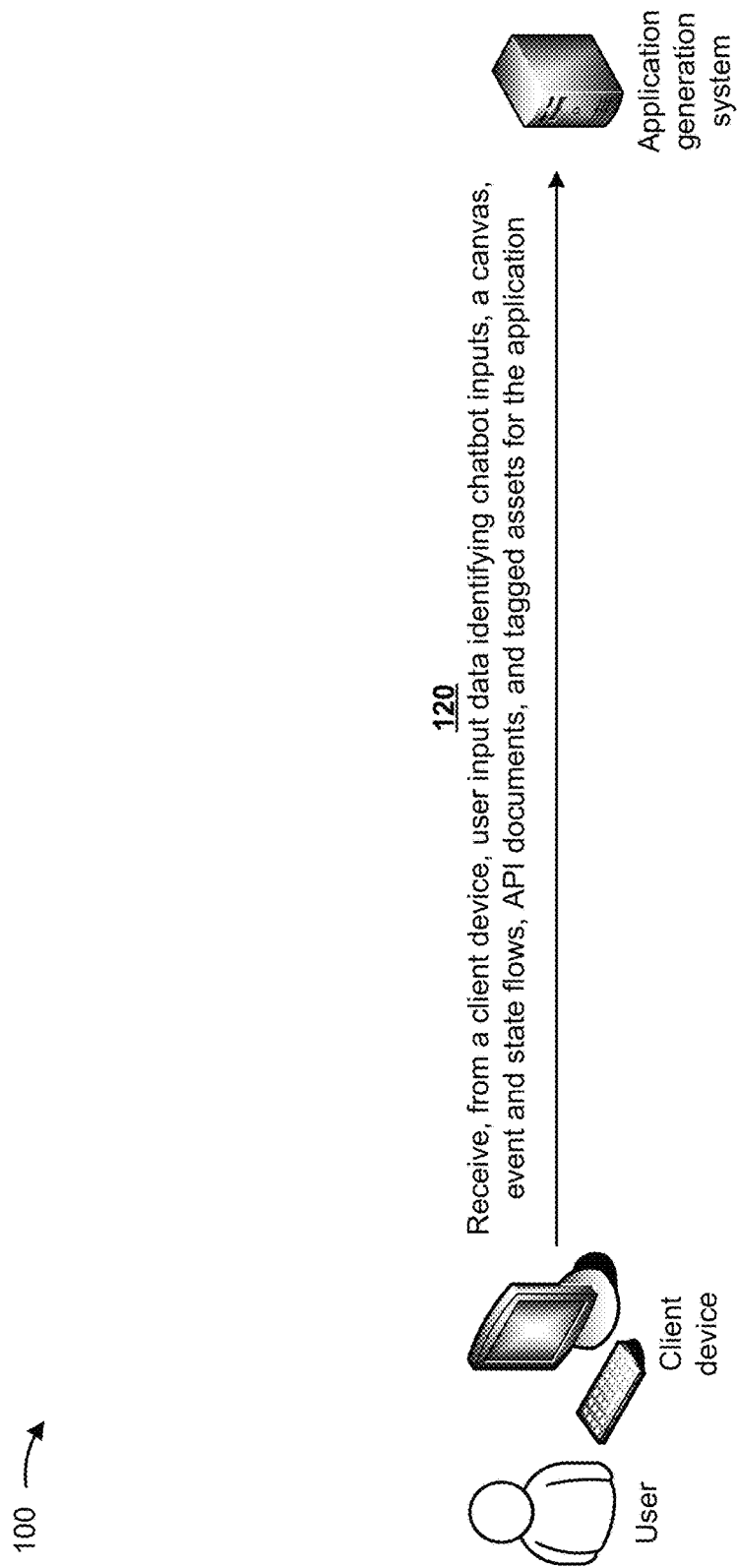

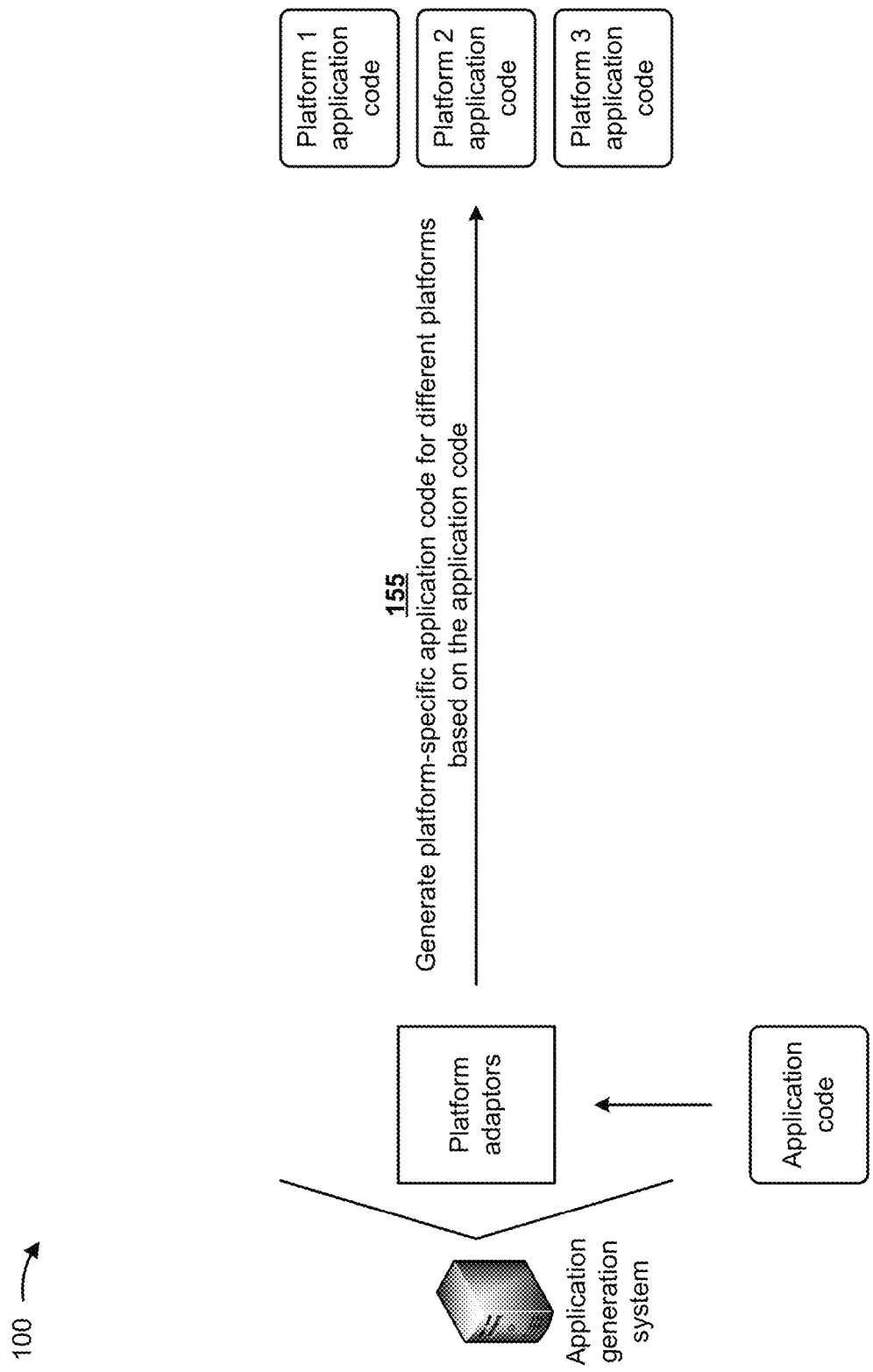

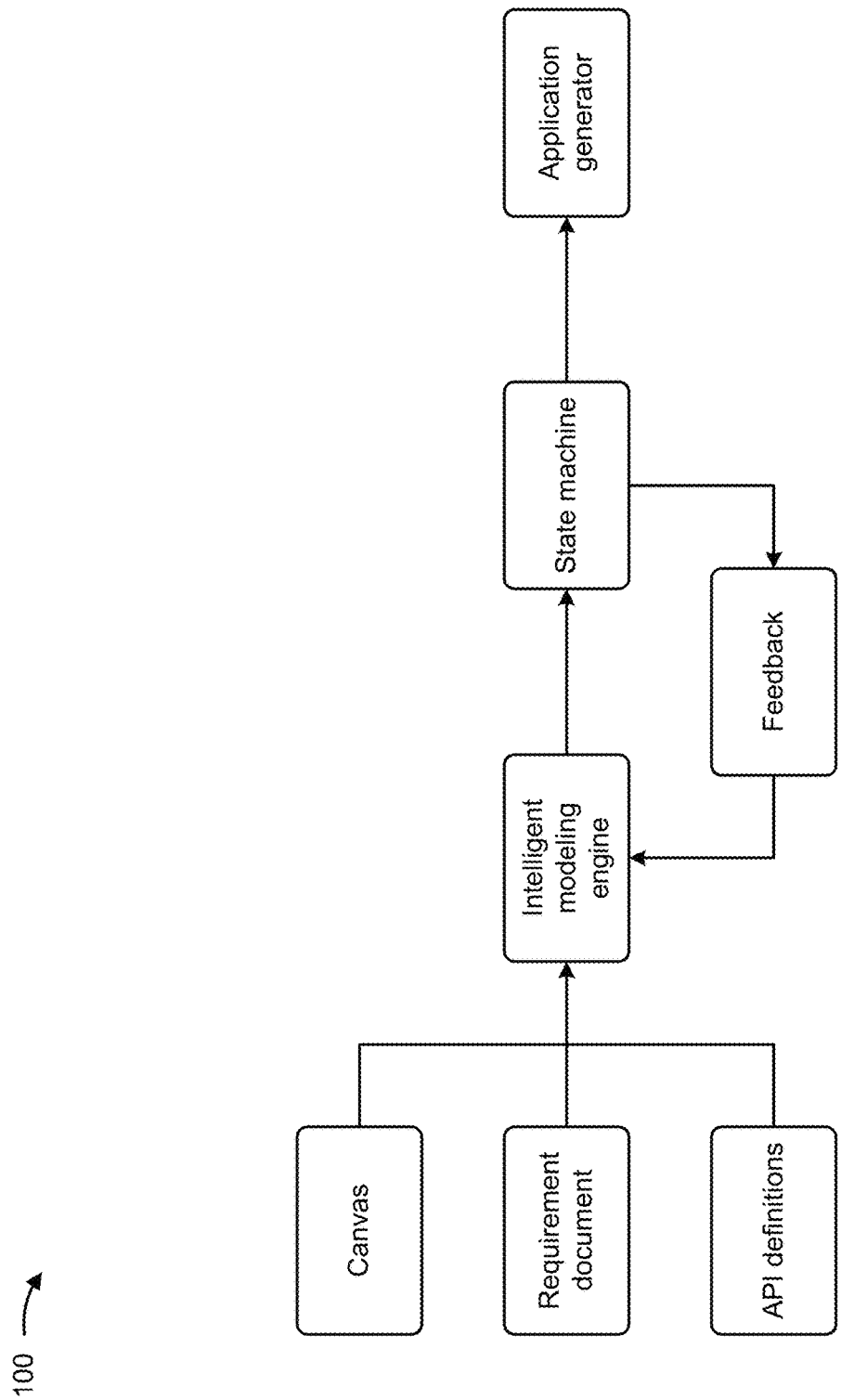

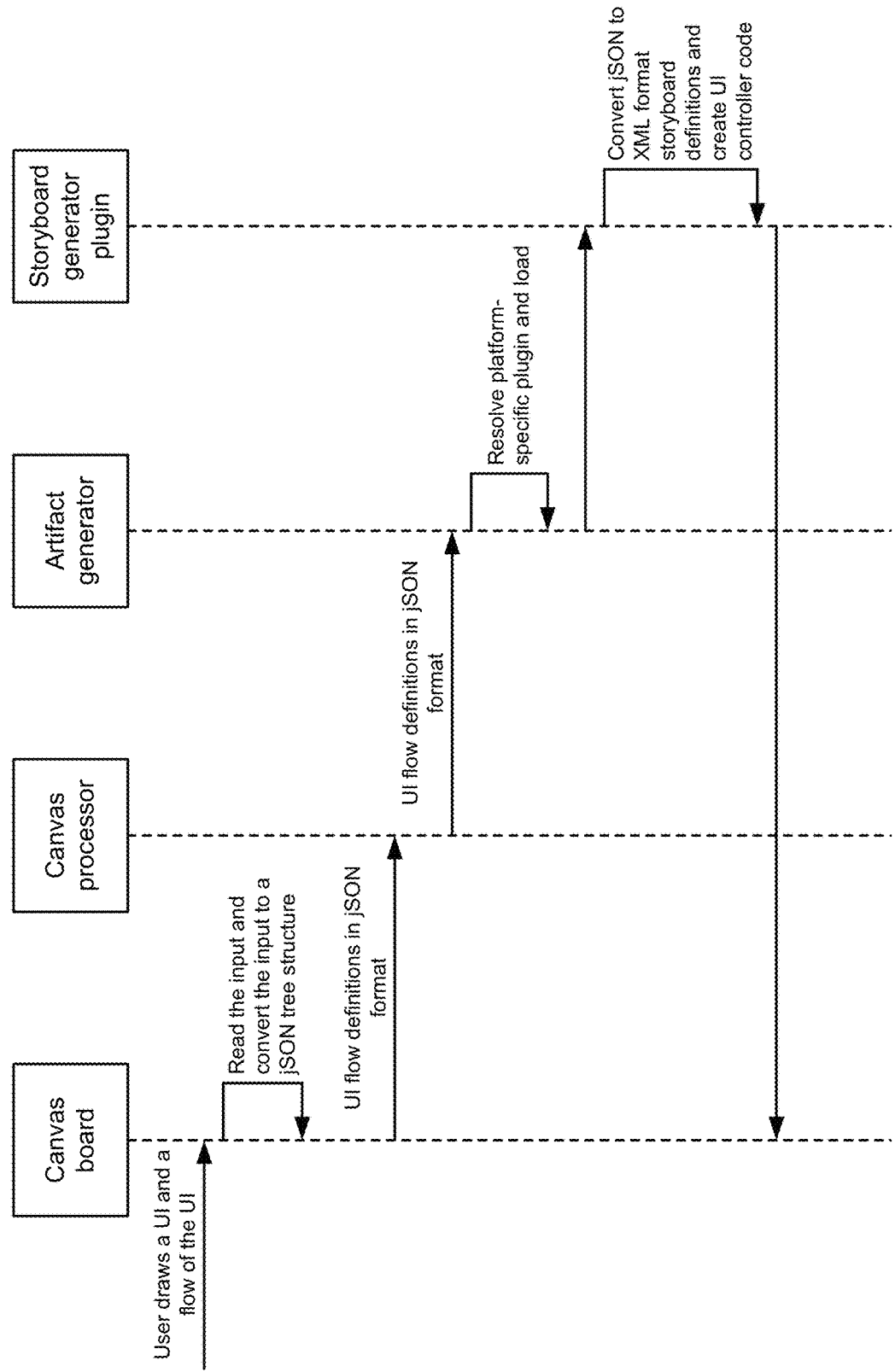

UTILIZING NATURAL LANGUAGE UNDERSTANDING AND MACHINE LEARNING TO GENERATE AN APPLICATION

BACKGROUND

An application is a computer program designed to perform a group of consolidated functions, tasks, or activities for the benefit of a user. An application may be bundled with a computer or system software of the computer or may be published separately. Examples of applications include word processors, spreadsheets, a web browser, a media player, and/or the like.

SUMMARY

According to some implementations, a method may include receiving, by a device and from a client device, user input data identifying one or more of chatbot inputs, a canvas, event and state flows, application programming interface (API) documents, or tagged assets for an application to be generated; receiving, by the device, a requirements document for the application to be generated; receiving, by the device, asset data identifying one or more reusable assets and components for the application to be generated; processing, by the device, the user input data, the requirements document, and the asset data, with a natural language understanding model, to extract entity data and intent classification data for the application; parsing, by the device, the API documents of the user input data to generate structured data identifying API endpoints, a request API model, and a response API model; processing, by the device, the structured data to generate a platform-specific API layer for the application; processing, by the device, the canvas of the user input data to identify user interface (UI) objects and to map the UI objects to UI elements for the application; generating, by the device, application code for the application based on the asset data, the entity data, the intent classification data, the platform-specific API layer, and the UI elements; and causing, by the device, the application code to be deployed.

According to some implementations, a device may include one or more memories and one or more processors. In some implementations, the one or more processors are communicatively coupled to the one or more memories. The one or more processors may be configured to: receive, from a client device, user input data identifying one or more of chatbot inputs, a canvas, event and state flows, application programming interface (API) documents, or tagged assets for an application to be generated; receive a requirements document for the application to be generated; receive asset data identifying one or more reusable assets and components for the application to be generated; process the user input data, the requirements document, and the asset data, with a natural language understanding model, to extract entity data and intent classification data for the application; parse the API documents of the user input data to generate structured data identifying API endpoints, a request API model, and a response API model; process the structured data to generate a platform-specific API layer for the application; process the canvas of the user input data to identify user interface (UI) objects and to map the UI objects to UI elements for the application; generate application code for the application based on the asset data, the entity data, the intent classification data, the platform-specific API layer, and the UI elements; generate platform-specific application code for different platforms based on the application code; and cause the platform-specific application code to be implemented on the different platforms.

According to some implementations, a non-transitory computer-readable medium may store one or more instructions. The one or more instructions, when executed by one or more processors of a device, may cause the one or more processors to: receive, from a client device, user input data identifying one or more of chatbot inputs, a canvas, event and state flows, application programming interface (API) documents, or tagged assets for an application to be generated; receive a requirements document for the application to be generated; receive asset data identifying one or more reusable assets and components for the application to be generated; process the user input data, the requirements document, and the asset data, with a natural language understanding model, to extract entity data and intent classification data for the application; parse the API documents of the user input data to generate structured data identifying API endpoints, a request API model, and a response API model; process the structured data to generate a platform-specific API layer for the application; process the canvas of the user input data to identify user interface (UI) objects and to map the UI objects to UI elements for the application; generate application code for the application based on the asset data, the entity data, the intent classification data, the platform-specific API layer, and the UI elements; generate platform-specific deployment scripts for the application based on the entity data, the intent classification data, and the application code; generate platform-specific application code for different platforms based on the application code; and perform one or more actions based on the platform-specific application code.

DETAILED DESCRIPTION

Figure 1A:
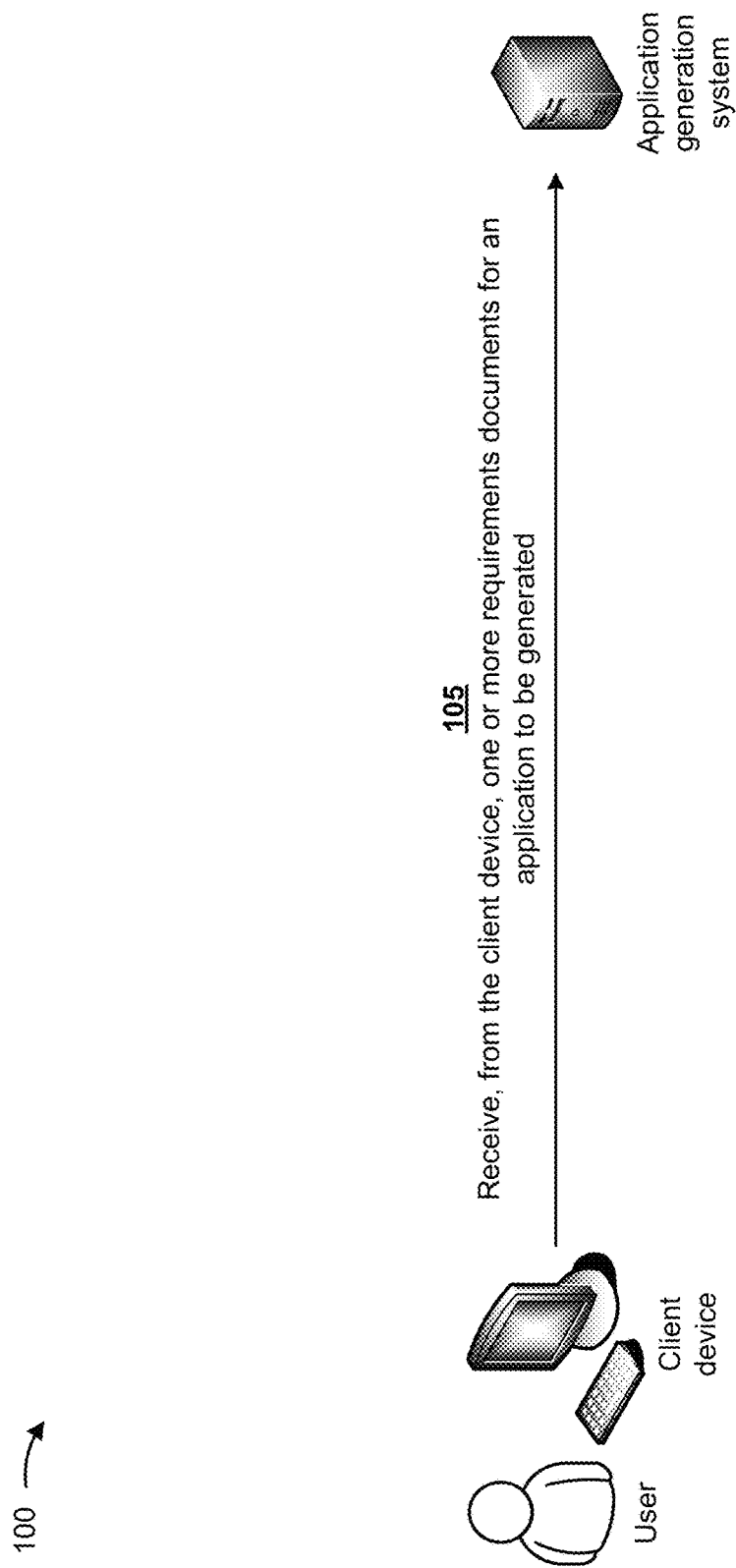
FIGS. 1A-1R are diagrams of an example implementation described herein.

The following detailed description of example implementations refers to the accompanying drawings. The same reference numbers in different drawings may identify the same or similar elements.

A software application may be developed by an individual through the use of another software application, such as an integrated development environment application, which may include a source code editor, debugger, and/or another tool or feature designed to make the development of the software application faster and/or easier. While some software applications and/or devices are capable of facilitating the development of software applications for multiple platforms (e.g., WINDOWS™, iOS™, ANDROID™, web-based, and/or the like), the individual generally requires special knowledge regarding software development, such as knowledge of the software framework and/or programming language in which the software application is to be developed.

Because today's digital environment is changing and evolving at a rapid pace, it may be beneficial to develop and deploy the application in a minimal amount of time. However, based on the complexity of the application, the development and deployment process may take days, weeks, months, and/or the like and may utilize large amounts of computing resources (e.g., processing resources, communication resources, memory resources, and/or the like) developing the application.

Some implementations described herein provide an application generation system that utilizes natural learning understanding and machine learning to automatically generate a software application (referred to herein as an application) based on a requirements document (e.g., a request for proposal (RFP) document, a software requirements specification (SRS) document, and/or the like). For example, the application generation system may obtain a requirements document for the application and may utilize a machine learning model to analyze the requirements document to determine intent classification data for the application. The intent classification data may include data indicating a type of the application, a purpose of the application, a platform on which the application is to run, and/or the like. The application generation system may interact with a user (e.g., via a chatbot) to obtain, from the user, user input data such as a canvas, application programming interface (API) documents, and/or the like. The application generation system may utilize machine learning to generate event and state flow information based on one or more portions of the user data. The application generation system may generate and/or deploy an application that satisfies the requirements identified in the requirements document based on the intent classification data, the event and state flow information, and the user input data.

In this way, the application generation system may quickly and efficiently generate and/or deploy an application thereby conserving resources (e.g., human resources, computing resources, and/or the like) and without requiring an individual developing the application to have special knowledge of the software framework and/or the programming language in which the application is to be developed.

Figure 1B:
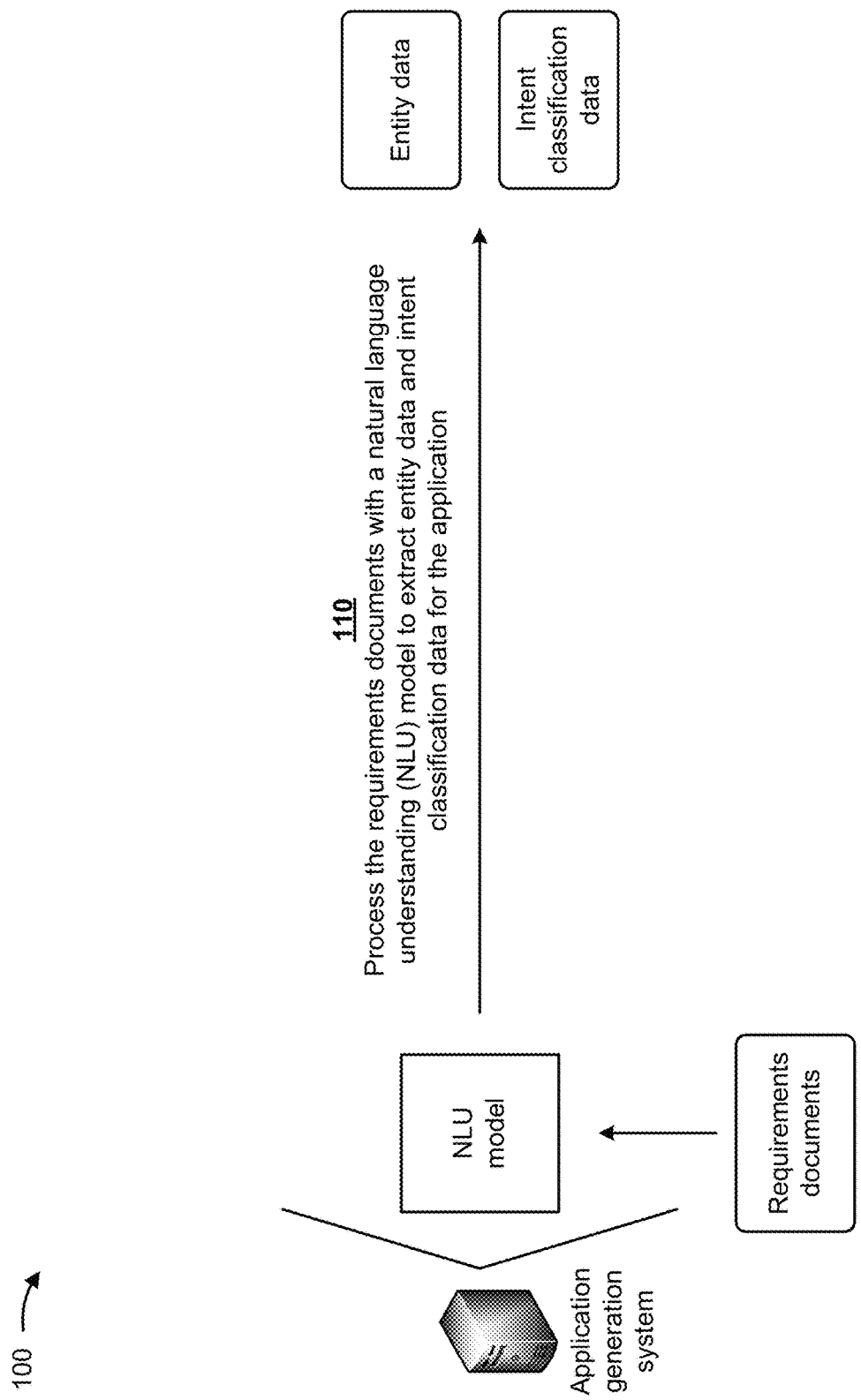
Figure 1C:
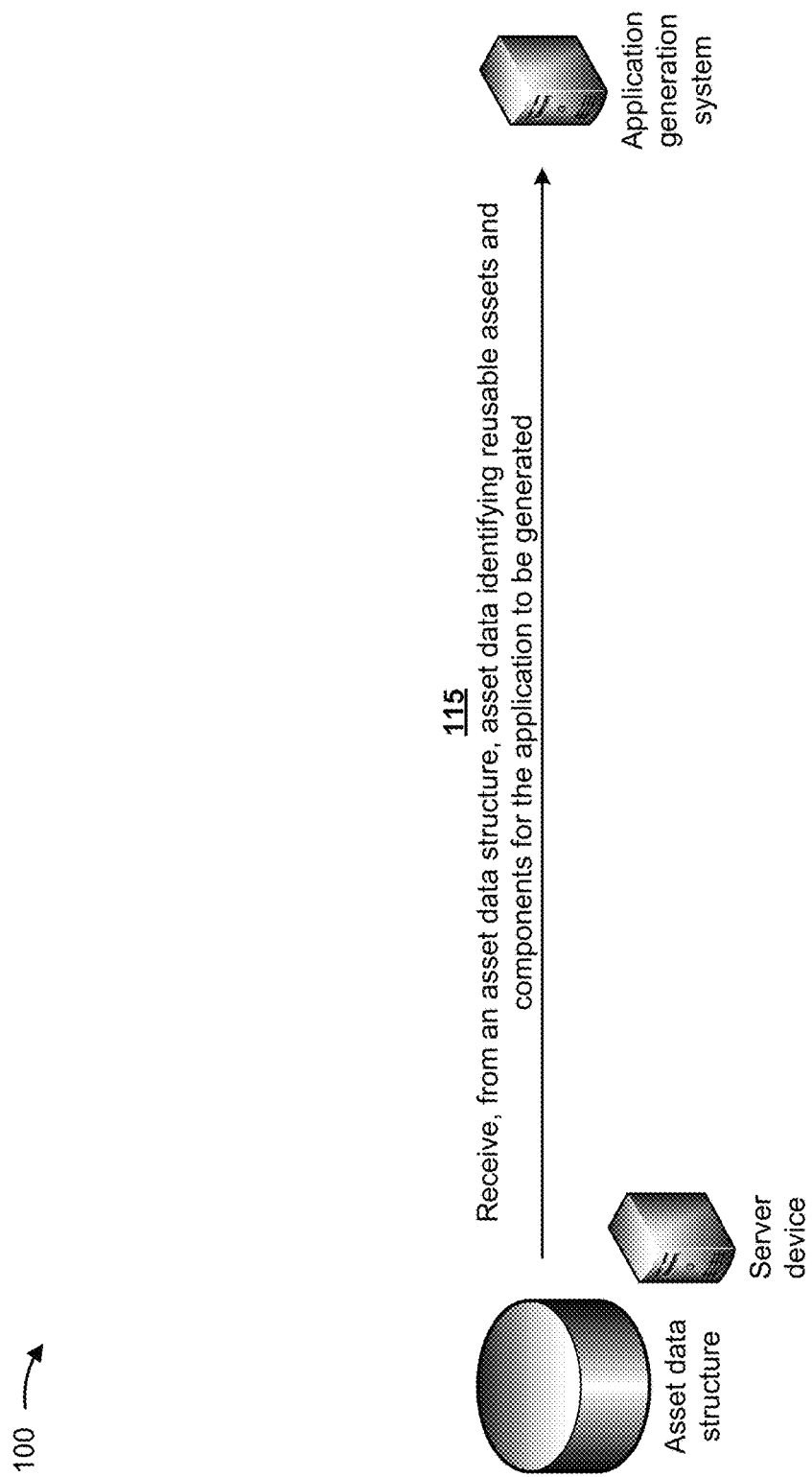
Figure 1E:
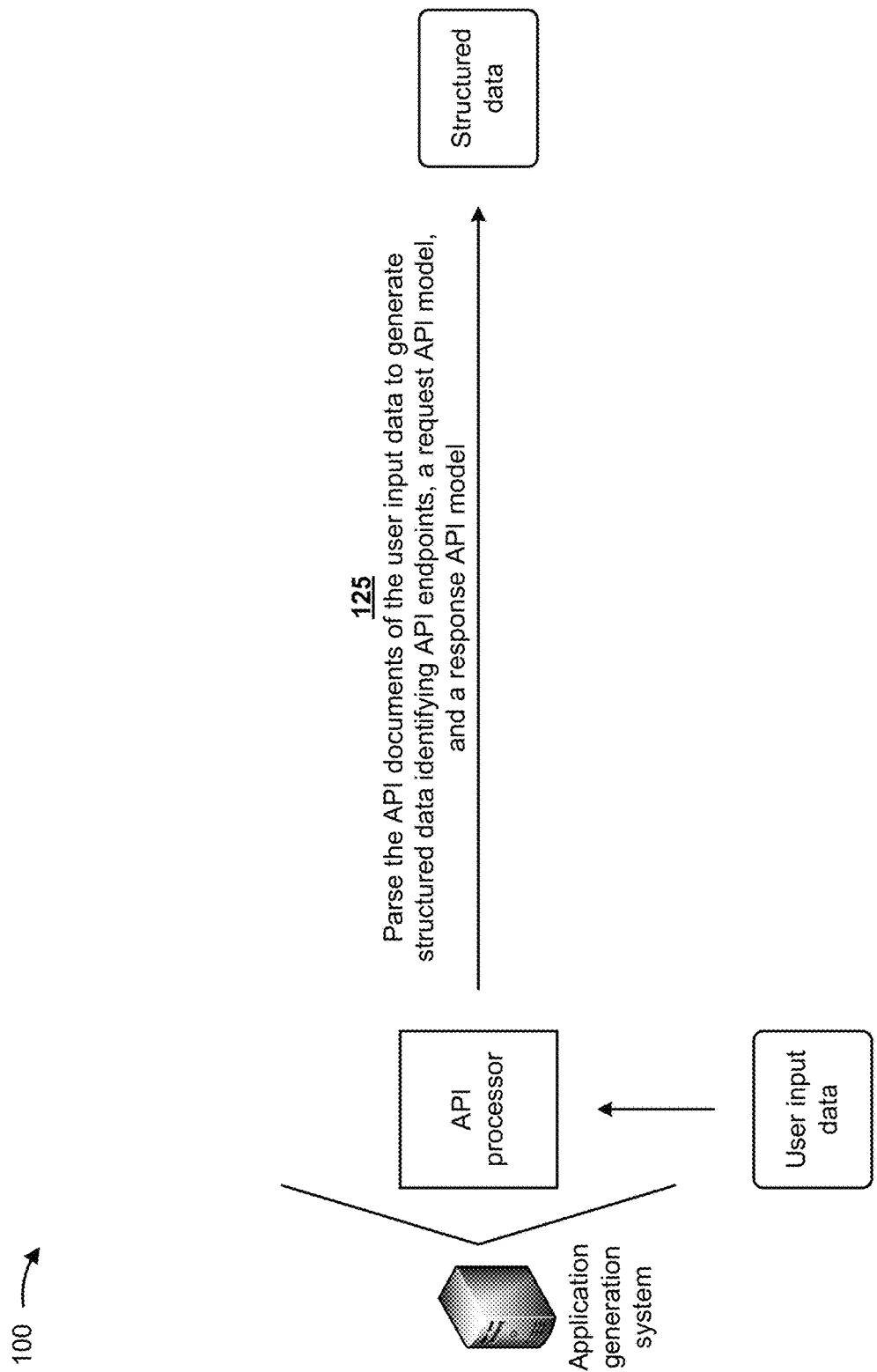
Figure 1F:
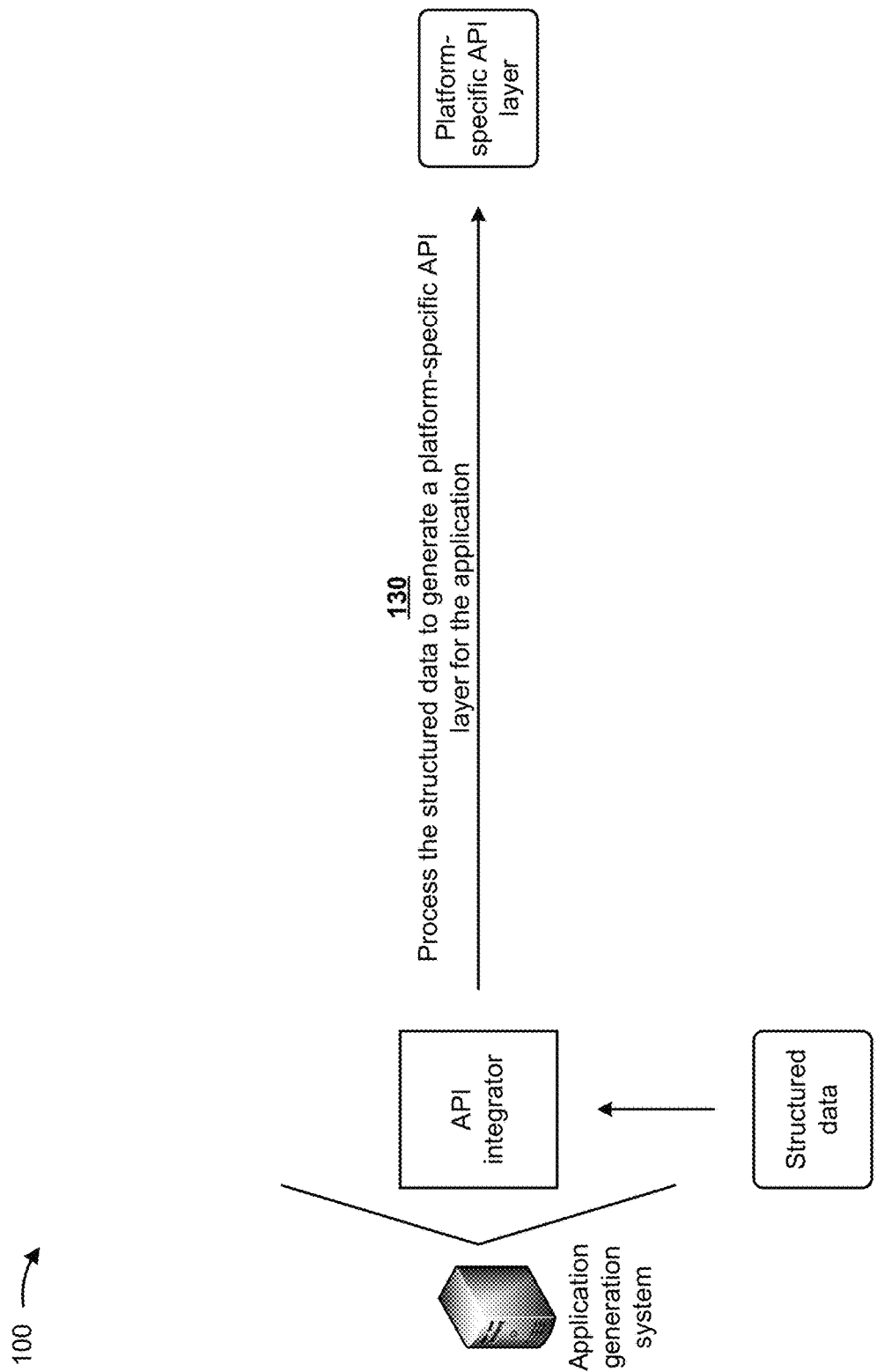
Figure 1G:
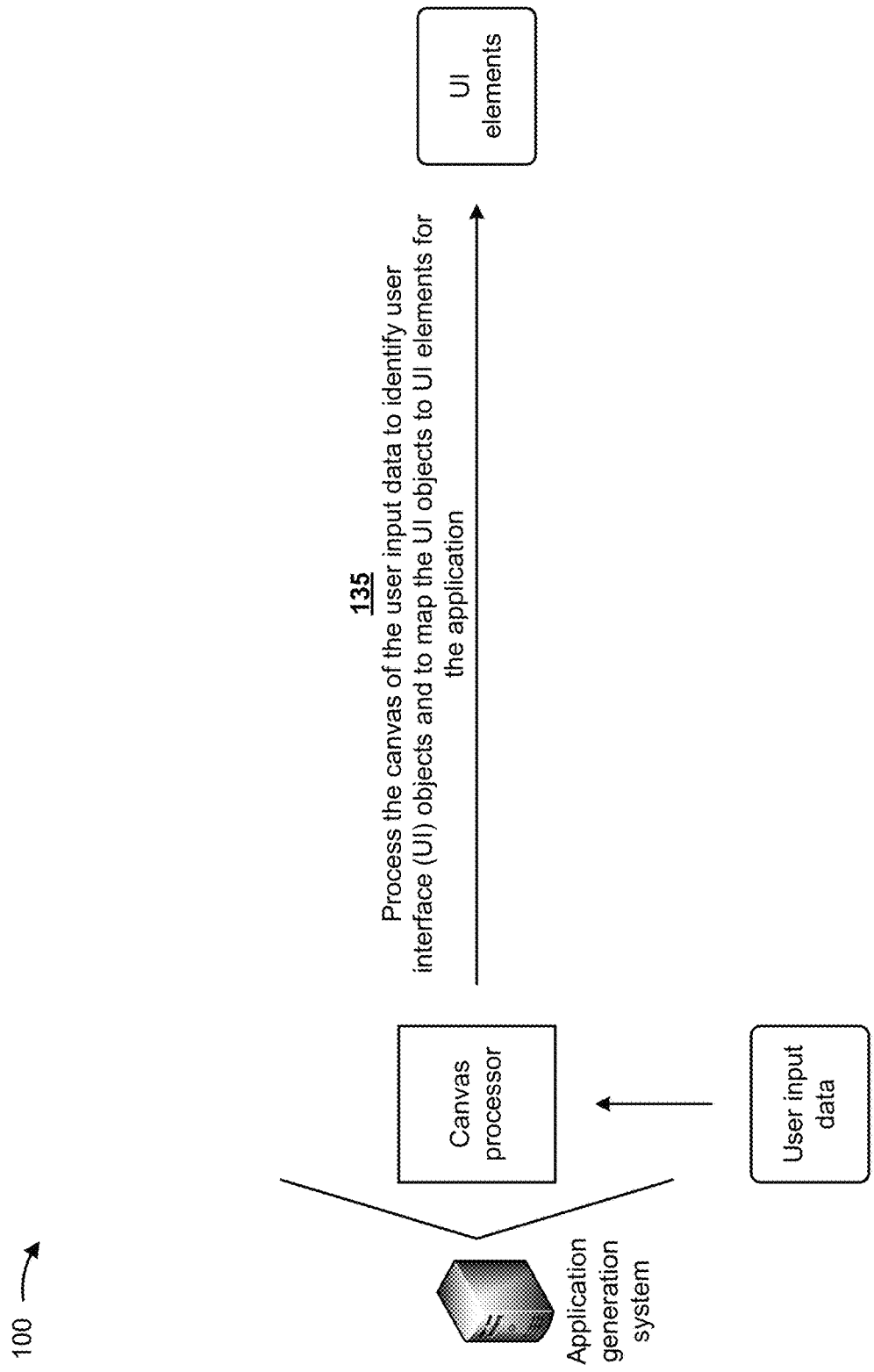
Figure 1H:
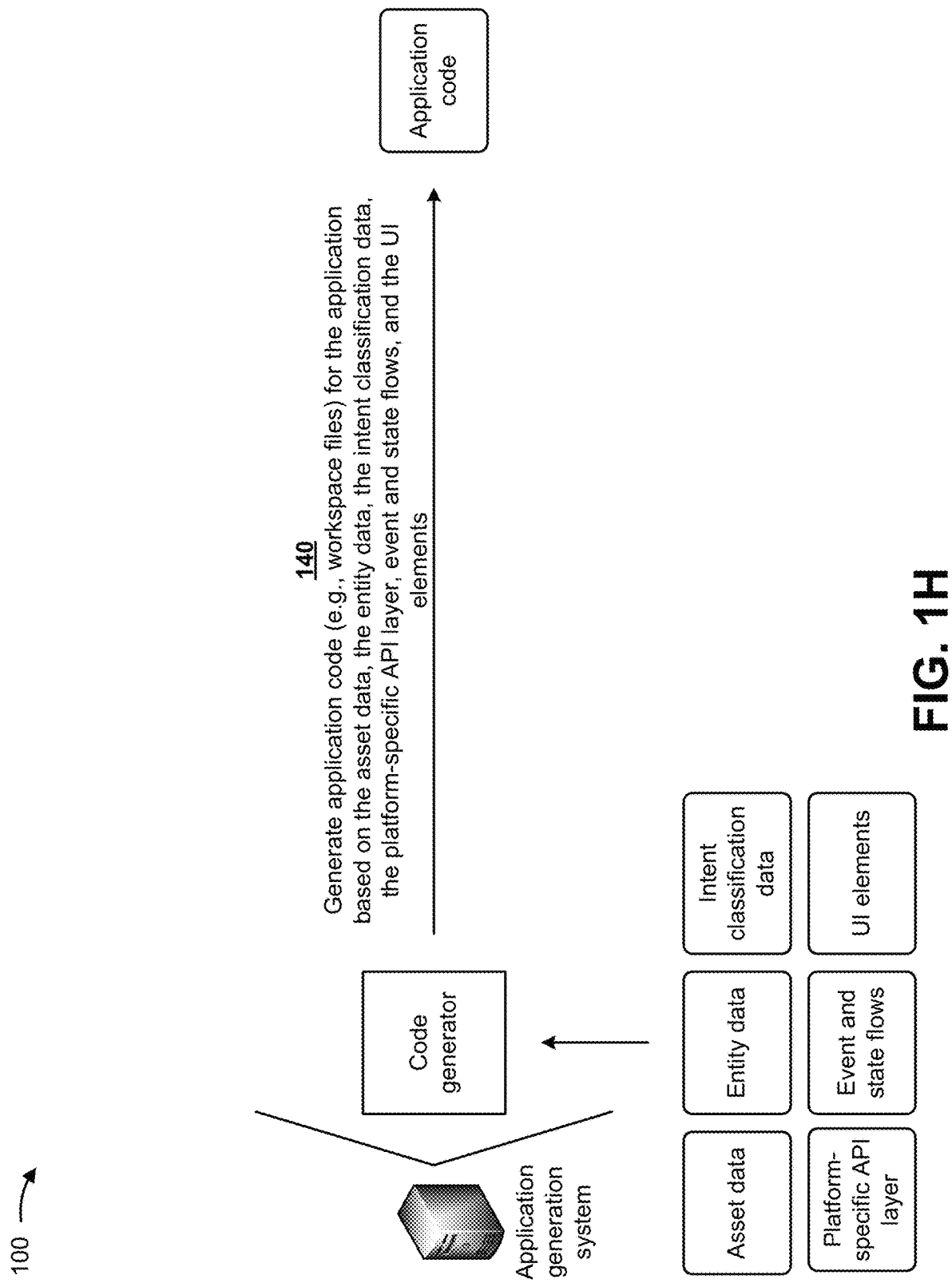
Figure 1I:
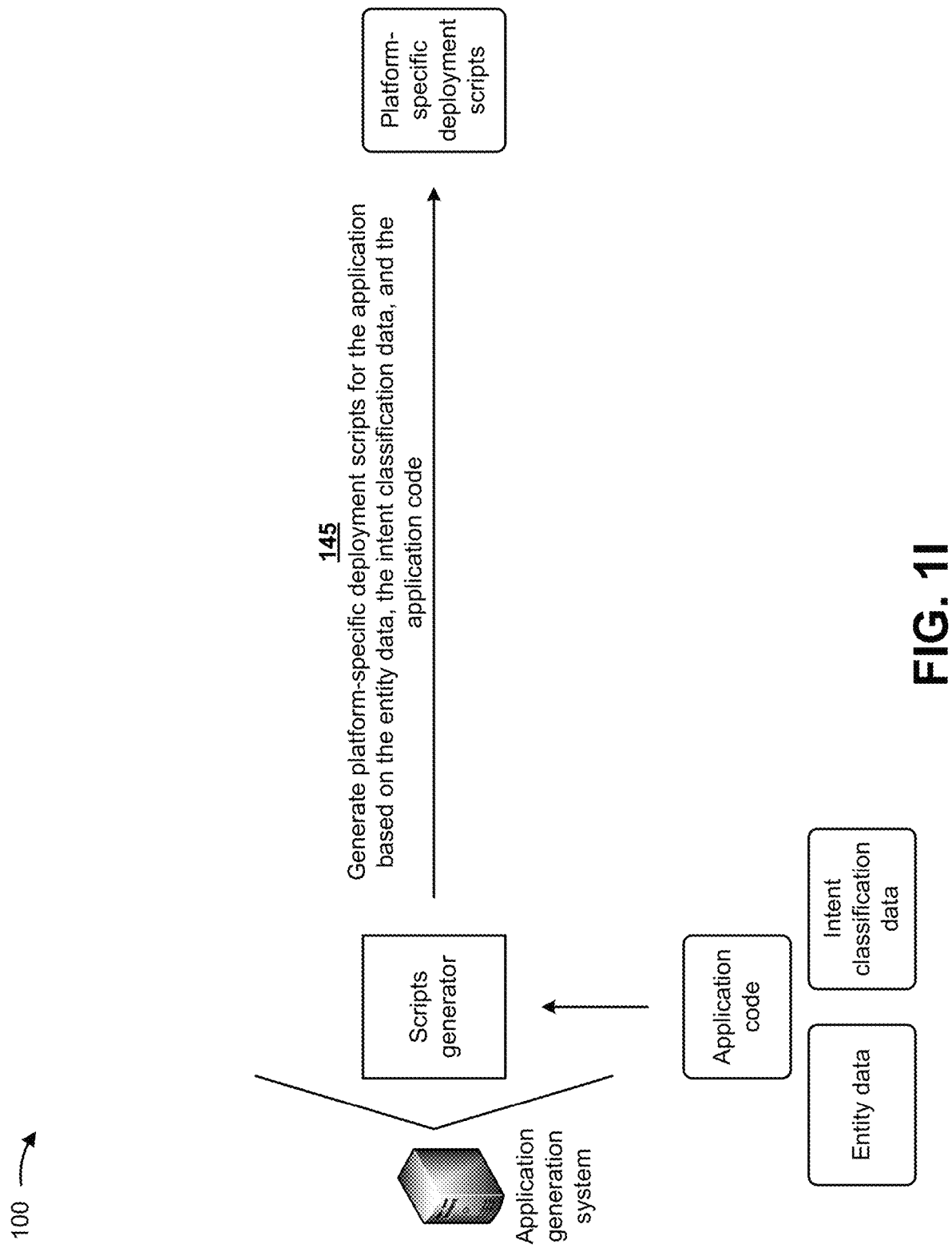
Figure 1J:
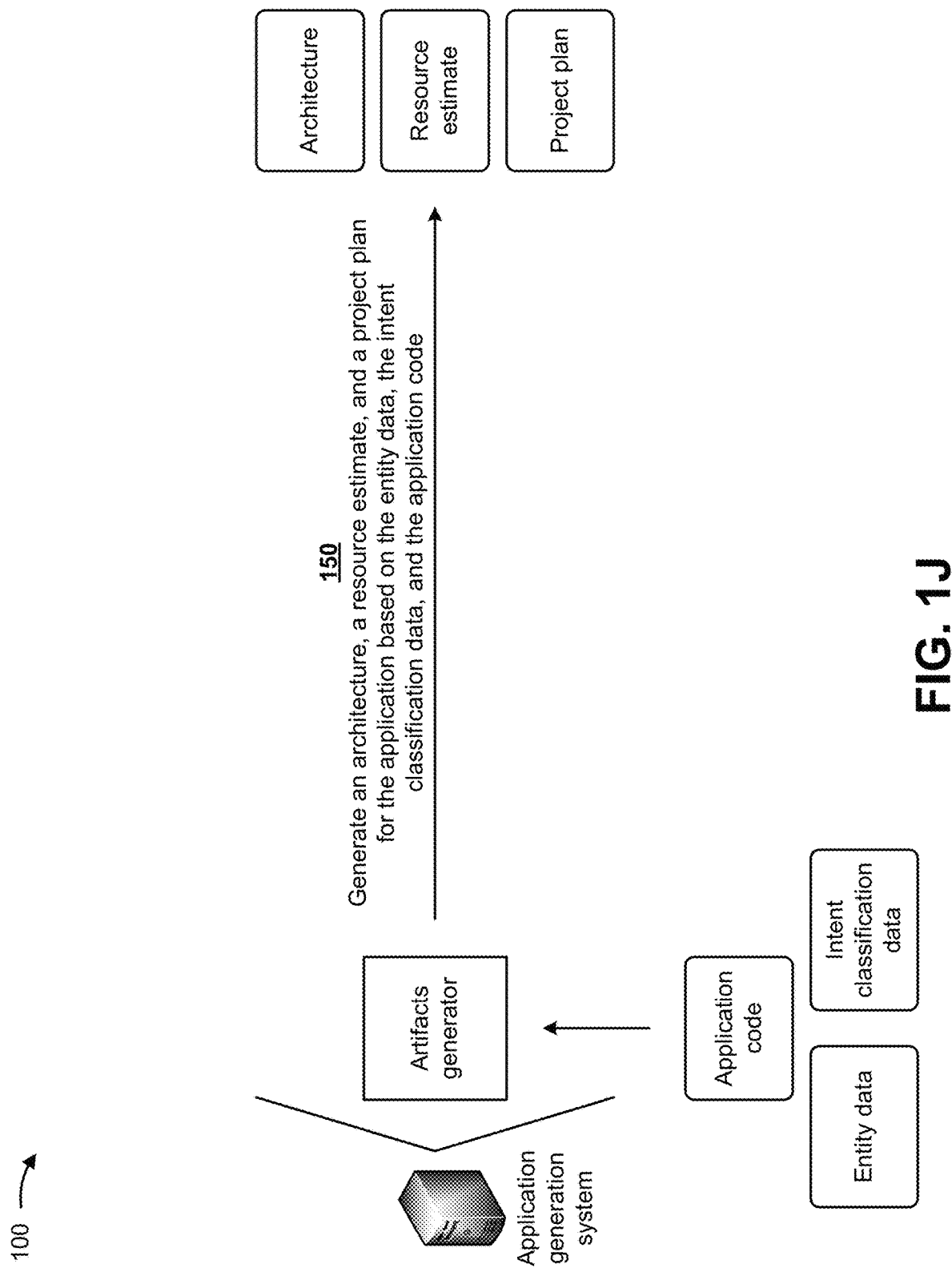
Figure 1L:
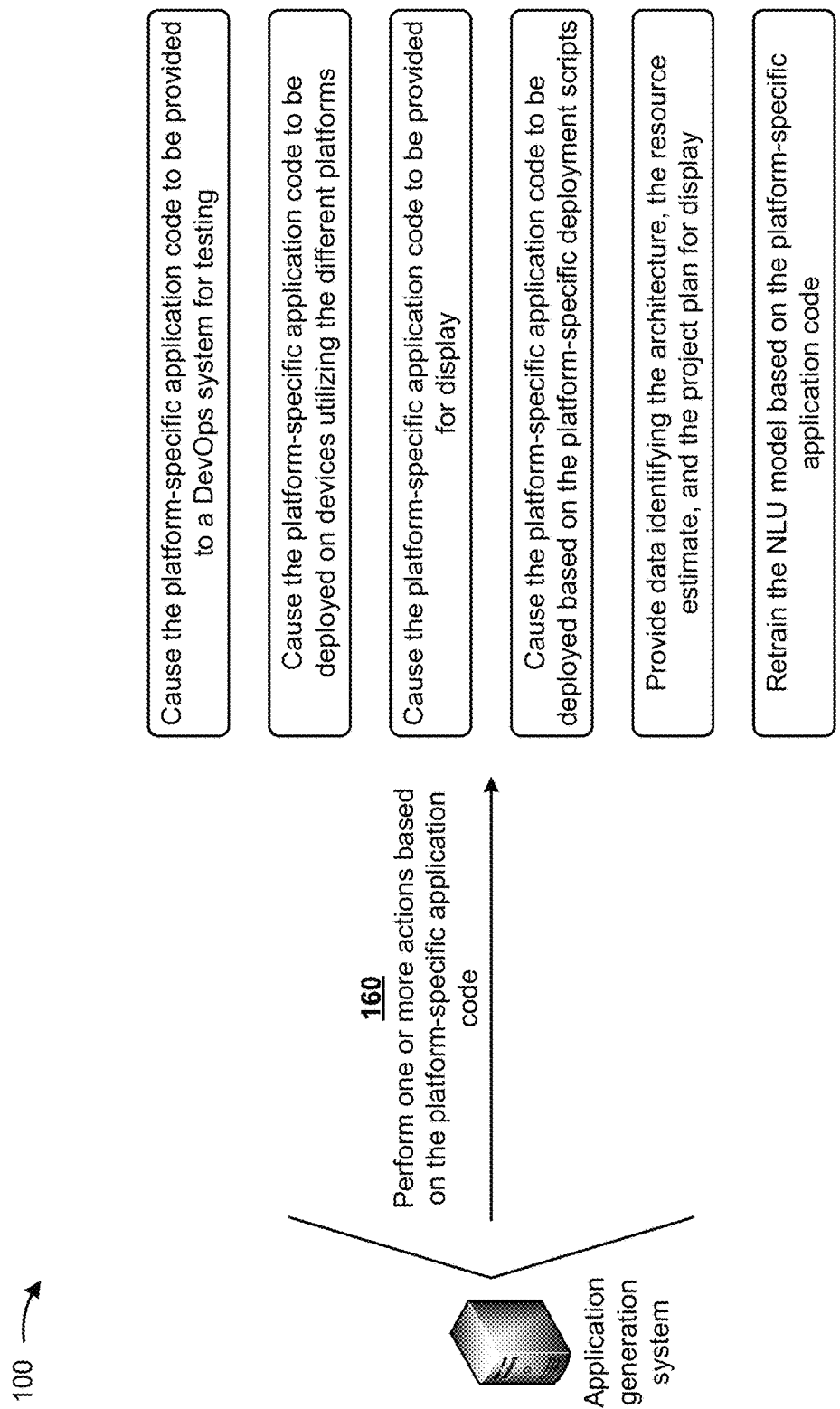
Figure 1M:
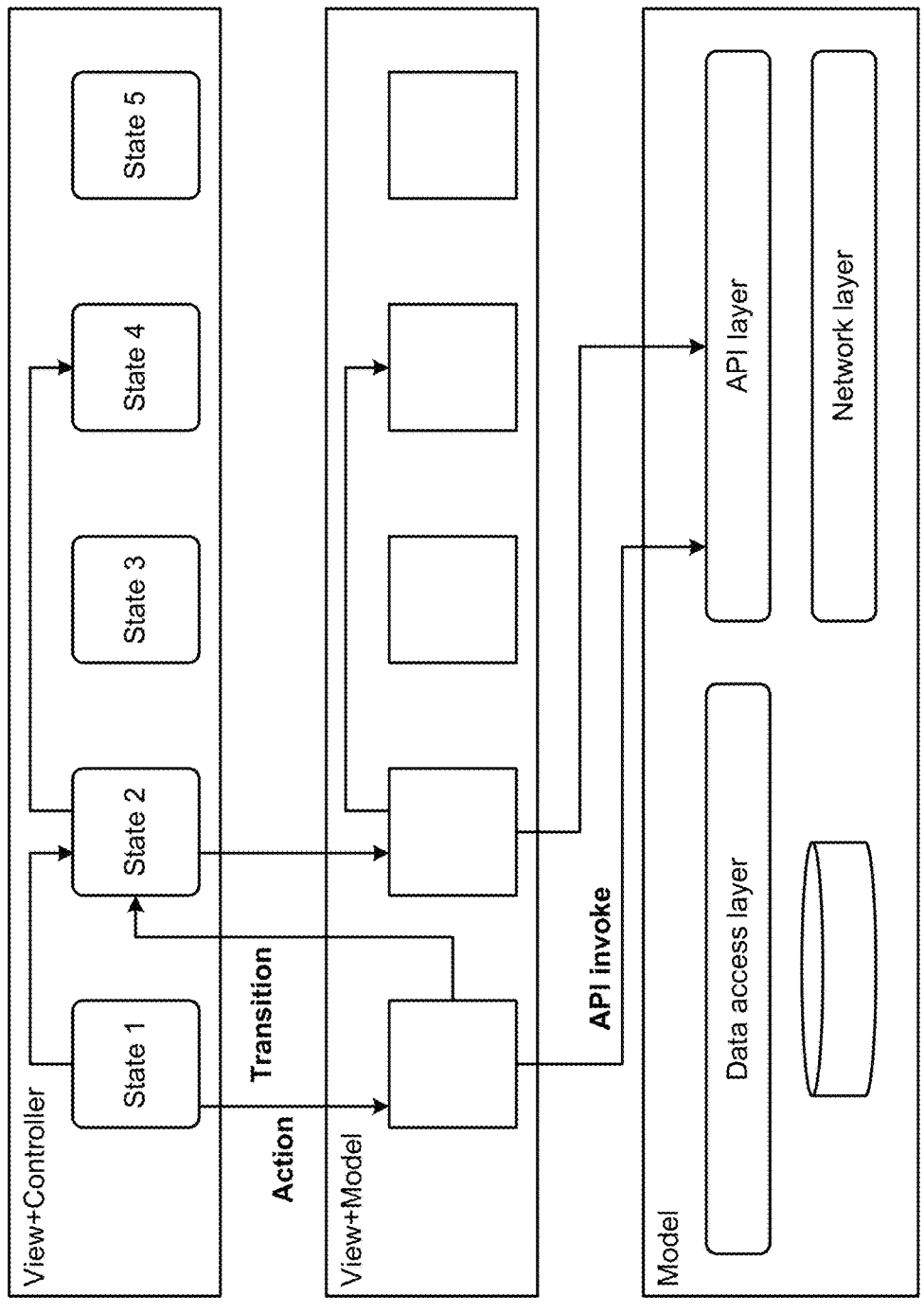
Figure 1P:
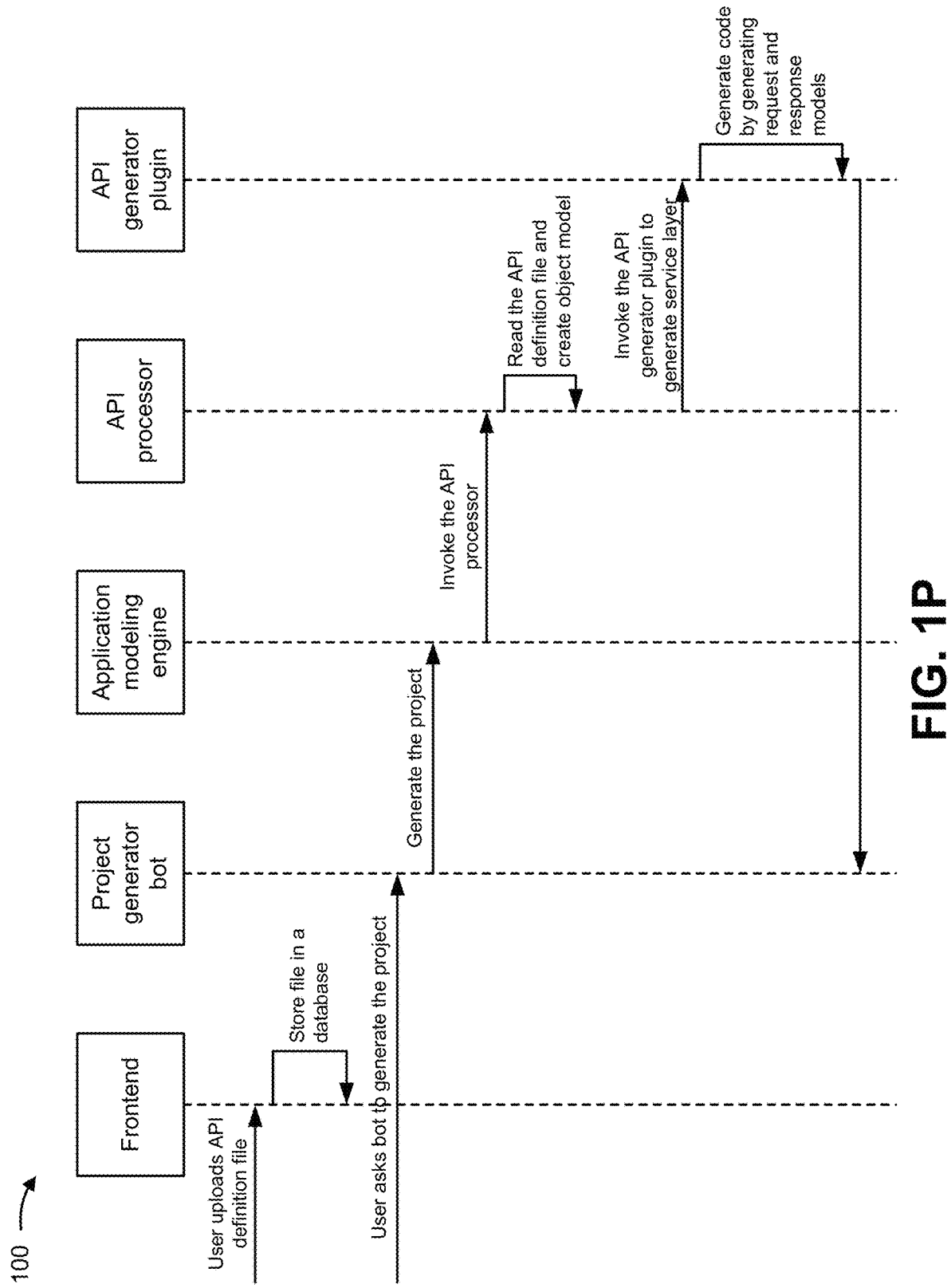
Figure 1Q:
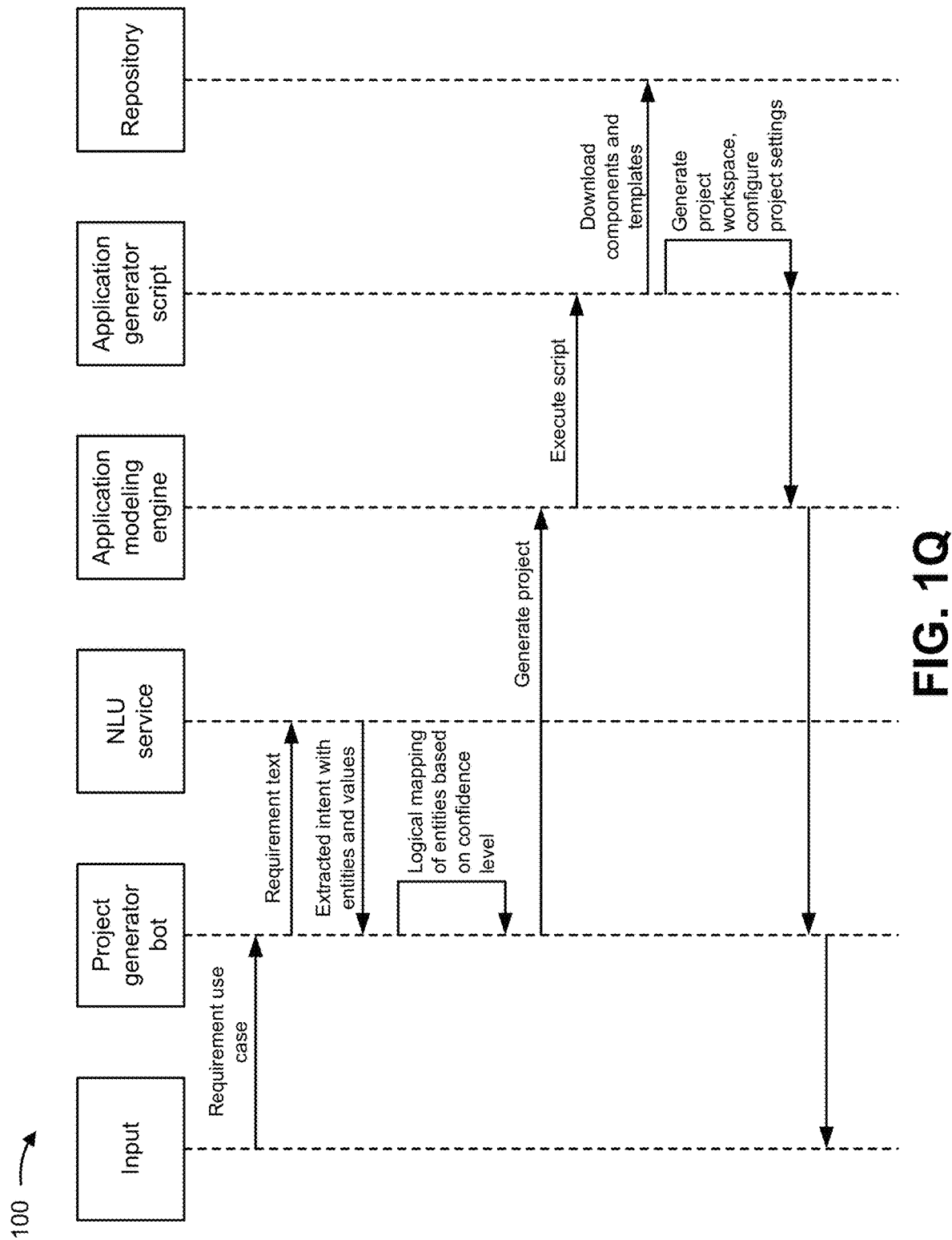
Figure 1R:
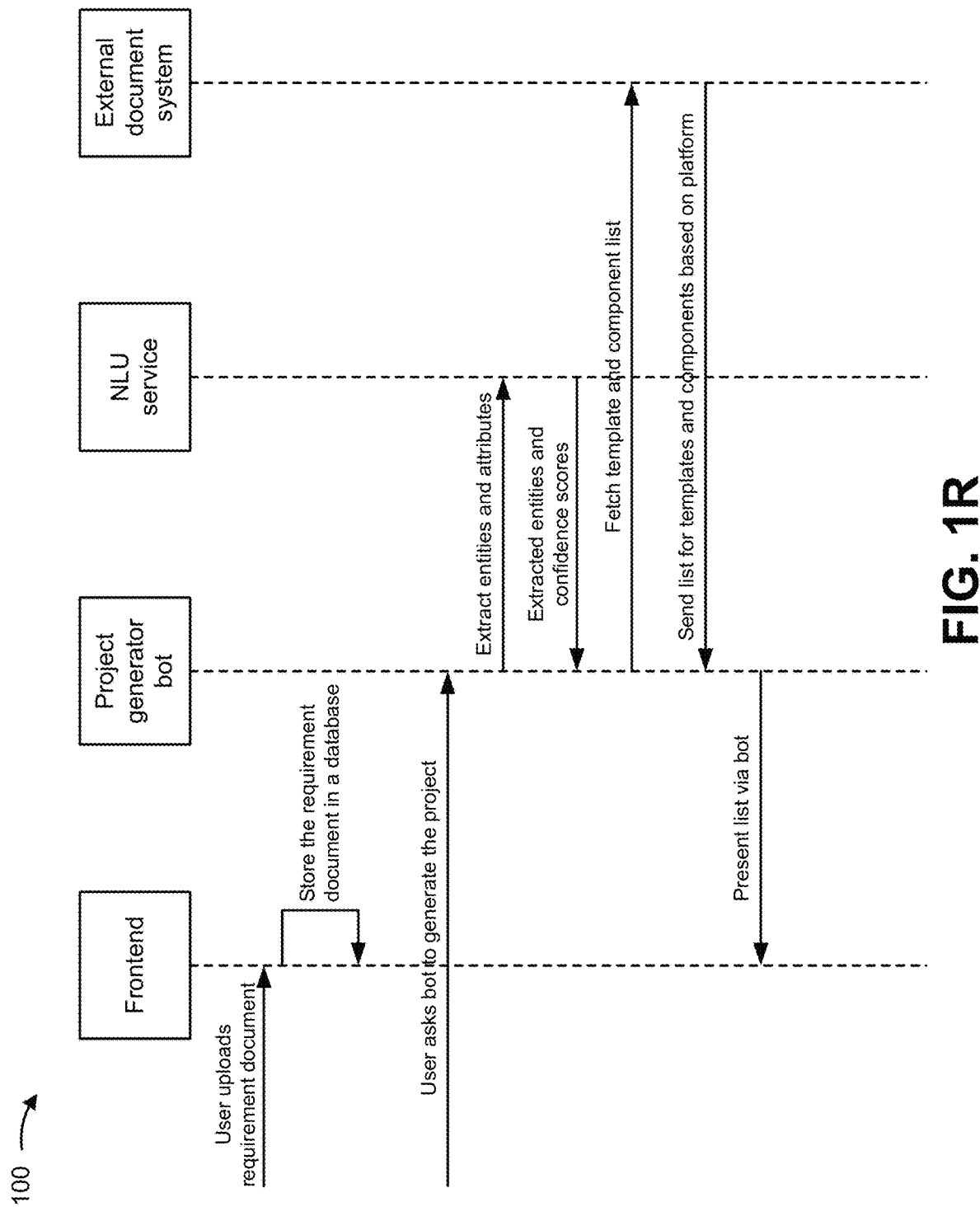

FIGS. 1A-1R are diagrams of one or more examples 100 associated with utilizing natural language understanding and machine learning to generate an application. As shown in FIGS. 1A-1R, a client device is associated with a user and an application generation system configured to automatically generate an application based on a requirements document. In some implementations, the client device may include a mobile device, a computer, a smart phone, and/or the like that the user may utilize to provide information to and/or receive information from the application generation system. The application generation system may include a system or platform that utilizes a machine learning model to automatically generate an application based on one or more requirements associated with the application.

In some implementations, the application generation system generates the application based on a requirements document. In some implementations, the requirements document is a document that includes information identifying one or more requirements associated with the application. For example, the requirements document may be a request for proposal (RFP) document, a software requirement specification (SRS) document, a user case document, and/or the like. In some implementations, the requirements document is a text input by a user. For example, the requirements document may be text a string, input by a user, indicating that the application generation system is to generate a particular type of application for performing a particular function.

As shown in FIG. 1A, and by reference number 105, the application generation system receives, from the client device, one or more requirements documents for the application to be generated. In some implementations, the application generation system receives the requirements document via an application installed on the client device.

The client device may receive from the application generation system, or from another source, an application associated with generating an application. In some implementations, the user may utilize the client device to download the application from the application generation system (or from the other source), and to download the application. Once the user installs the application, the user may utilize the client device to set up the application. For example, the application may request that the user provide credentials (e.g., a username, a password, an employee identifier, and/or the like) for accessing the application.

The application may provide instructions associated with using the application generation system to automatically generate the application. In some implementations, the application may provide the instructions for display to the user. Alternatively, and/or additionally, the application may include a chatbot and the chatbot may interact with the user to provide the instructions. The instructions may include information indicating that the user is to provide a requirements document to the application generation system.

The user may use the client device to provide the requirements document to the application generation system. For example, the user may store the requirements document in a memory of the client device. The user may input information identifying the requirements document and/or information identifying a location at which the requirements document is stored via the application to cause the client device to retrieve the requirements document from the memory and/or to provide the requirements document to the application generation system.

Alternatively, and/or additionally, the application generation system receives the requirements document from a device other than the client device. The user may input information (e.g., a URL) identifying a device (e.g., a server device, a cloud storage device, and/or the like) storing the requirements document via the application.

As shown in FIG. 1B, and by reference number 110, the application generation system processes the requirements documents with the natural language utilization (NLU) model to extract entity data and intent classification data for the application. In some implementations, the application generation system extracts the entity data and the intent classification in a structured manner to generate structured data (e.g., an XML, file) that can be utilized by the application generation system to generate application architecture for the application.

The entity data may include information identifying one or more entities (e.g., a person that is to use the application, a type of platform associated with the application, and/or the like) referred to in the requirements documents. For example, the entity data may include information identifying a platform on which the application is to run, an output to be generated by the application, an input to be received by the application, and/or the like.

The intent classification data may include information indicating a type of the application, a purpose of the application, a context in which the application is to be used, and/or the like. For example, the intent classification data may include information indicating that the application is a comparison type of application (e.g., an application for comparing prices of products), an educational type of application (e.g., an application for teaching a skill, a foreign language, and/or the like to a user), and/or the like.

In some implementations, the application generation system may determine a confidence level associated with the entity data and/or the intent classification data. The confidence level may be a value indicating a probability that the entity data and/or the intent classification data corresponds to the information included in the requirements document.

In some implementations, the application generation system may use a machine learning model to process the one or more requirements documents. The application generation system may train a NLU machine learning model based on one or more parameters associated with analyzing a requirements document. The application generation system may train the NLU machine learning model using historical data associated with generating an application according to the one or more parameters. Using the historical data and the one or more parameters as inputs to the NLU machine learning model, the application generation system may train the NLU machine learning model to determine one or more requirements for an application.

In some implementations, the application generation system may portion the historical data into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the application generation system preprocesses and/or performs dimensionality reduction to reduce the historical data to a minimum feature set. In some implementations, the application generation system may train the NLU model on this minimum feature set, thereby reducing processing to train the machine learning model, and may apply a classification technique, to the minimum feature set.

In some implementations, the application generation system may use a classification technique, such as a logistic regression classification technique, a random forest classification technique, a gradient boosting machine learning (GBM) technique, and/or the like, to determine a categorical outcome (e.g., that an application is associated with an iOS platform, that an application is associated with an Android platform, and/or the like). Additionally, or alternatively, the application generation system may use a naïve Bayesian classifier technique. In this case, the application generation system may perform binary recursive partitioning to split the data of the minimum feature set into partitions and/or branches and use the partitions and/or branches to perform predictions. Based on using recursive partitioning, the application generation system may reduce utilization of computing resources relative to manual, linear sorting and analysis of data items, thereby enabling use of thousands, millions, or billions of data items to train a model, which may result in a more accurate model than using fewer data items.

Additionally, or alternatively, the application generation system may use a support vector machine (SVM) classifier technique to generate a non-linear boundary between data items in the training set. In this case, the non-linear boundary is used to classify test data (e.g., data relating requirements of an application) into a particular class (e.g., a class indicating that the application is associated with a particular platform, a class indicating that the application is to perform a particular function, and/or the like).

In some implementations, the application generation system may utilize the trained NLU machine learning model to process the requirements documents. In some implementations, the application generation system may parse natural language included in the requirements document. For example, the application generation system may obtain data identifying, in natural language, a description of the application, and may parse the data to identify an entity associated with the application, a requirement associated with the application, and/or the like.

In some implementations, the application generation system may determine a characteristic of the application based on natural language processing of the requirements document, which may include a description of the application. For example, based on a description of the application being "A user can use a tablet to access the application", the application generation system may use natural language processing to determine that a characteristic of the application is that the application is associated with an iOS platform and an Android platform.

In this way, the application generation system may identify characteristics associated with an application to be generated, as described herein. Based on applying a rigorous and automated process associated with automatically generating an application, the application generation system enables recognition and/or identification of thousands or millions of entities, intent classifications, requirements, and/or the like for thousands or millions applications to be generated, thereby increasing an accuracy and consistency of automatically generating an application relative to requiring computing resources to be allocated for hundreds or thousands of technicians to manually generate an application of the thousands or millions applications.

In some implementations, the application generation system identifies reusable assets and components based on the entity data and/or the intent classification data. The reusable assets and components may be software modules that can be included in an application to perform a particular function, such as a networking module for providing an asynchronous interface to provide REST API support to fetch, upload, or download data, a user interface module for providing a user interface, and/or the like.

As shown in FIG. 1C, and by reference number 115, the application generation system receives, from an asset data structure, asset data identifying reusable assets and components for the application to be generated. The asset data structure may store information identifying reusable assets and components available to the application generation system for generating an application. For example, the asset data structure may store information identifying software modules stored in an asset repository associated with the application generation system, information identifying open source components, and/or the like. The information identifying a reusable asset or component may be associated with information identifying an entity associated with the reusable asset or component, information identifying a functionality associated with the reusable asset or component, information identifying an industry associated with the reusable asset or component, information identifying an intent classification associated with the reusable asset or component, and/or the like. The application generation system may query the asset data structure to identify a set of reusable assets and components associated with an entity identified in the entity data and/or an intent classification identified in the intent classification data.

As shown in FIG. 1D, and by reference number 120, the application generation system receives, from a client device, user input data identifying chatbot inputs, a canvas, event and state flows, API documents, and tagged assets for an application to be generated. The chatbot inputs may include information input by a user via a chatbot interface. The application generation system may provide, to the client device, a request for information associated with the application. The client device may receive the request and may provide the request to the user via a chatbot interface. The user may input a response (e.g., a chatbot input) to the request via the chatbot interface and the client device to provide the response to the application generation system.

The canvas may include information associated with a layout of a user interface associated with the application. In some implementations, the user may utilize the client device to generate an application wireframe associated with the application. For example, the user may access a canvas provided by the client device. The canvas may enable the user to define user interface elements associated with a user interface for the application. For example, the canvas may enable the user to generate an application wireframe corresponding to a visual representation of a user interface using visual elements such as placeholders, boxes, lines, and/or the like. The user may utilize the canvas to design one or more application wireframes and the client device may transmit the one or more application wireframes to the application generation system. In some implementations, the client device converts the one or more application wireframes into structured data (e.g., an extensible markup language (XML) document) and transmits the structured data to the application generation system.

The information identifying the event and state flows may include information identifying information flows within the application. For example, the event and state flows may include information identifying states of the application (e.g., an initial state that enables a user to provide authentication information for accessing the application, a second state associated with authenticating the user based on the authentication information, and/or the like) and information identifying events that cause the application to transition from one state to another state (e.g., information indicating that the application should transition from the initial state to the second state based on authenticating the user).

In some implementations, the information identifying the event and state flows includes a data flow diagram. The data flow diagram may be a visual representation of the information flows associated with the application. The data flow diagram may include a context diagram corresponding to a first level of the data flow diagram. The context diagram may be a simple representation of the entire application (e.g., a group of icons representing major functions of the application). A second level of the data flow diagram may be a visual representation of one or more lower-level functions that together form a major function represented in the context diagram. The data flow diagram may include additional levels corresponding to lower-level functions of a function depicted in a previous level.

The information identifying the tagged assets may include information identifying a reusable asset or component identified by the application generation system as being associated with the application. The application generation system may provide the asset data identifying the reusable assets and components for the application to the client device. The client device may receive the asset data and may provide the asset data for display to the user. The user may select or tag one or more of the identified reusable assets and components. The client device may provide information identifying the selected or tagged reusable assets and components (e.g., information identifying the tagged assets) to the application generation system.

The API documents may include information associated with using and integrating an API associated with the application. In some implementations, an API document may include a resource description, information identifying an endpoint, information identifying a method, information identifying a parameter associated with the API, and/or the like. The resource description may identify information or resource returned by the API. The endpoint may indicate how to access the resource (e.g., a URL, information identifying a path to the resource, and/or the like). The method indicates the allowed interactions (e.g., GET, POST, DELETE, and/or the like) with the resource. The parameter may include information identifying an option that can be passed with the endpoint to influence the response (e.g., parameter indicating that the information returned by the API is to be in a particular format). As shown in FIG. 1E, and by reference number 125, the application generation system parses the API documents of the user input data to generate structured data (e.g., XML, data) identifying API endpoints, a request API model, and a response API model.

As shown in FIG. 1F, and by reference number 130, the application generation system processes the structured data to generate a platform-specific API layer for the application. The application generation system may determine a platform associated with the application based on the requirement documents and/or the user input data. The application generation system may generate an API layer based on the platform associated with the application. The API layer may act as a bridge that enables data to be transmitted between a client device on which the application is running and the application.

As shown in FIG. 1G, and by reference number 135, the application generation system processes the canvas of the user input data to identify user interface (UI) objects and to map the UI objects to UI elements for the application. The application generation system may identify an element included in the application wire and may map the element to a UI element (e.g., a checkbox, a radio button, a slider, an icon, and/or the like) to be included in the user interface of the application. For example, the application generation system may identify an element in the application wire diagram. The application generation system may identify a tag and/or other information indicating a purpose, a function, and/or the like of the element. The application generation system may map the element to a UI element based on the tag and/or the other information.

In some implementations, the application generation system utilizes a canvas processor to identify the UI objects and to map the UI objects to the UI elements. The canvas may include an XML document that includes information identifying the UI objects. The canvas processor may be an XML, file processor that processors the XML, document to identify the UI objects. The canvas processor may determine a particular platform associated with the application. The canvas processor may map the UI objects to UI elements associated with the particular platform.

In some implementations, the application generation system generates a storyboard file (e.g., an iOS presentation file, an Android presentation file, and/or the like) for the application based on the UI elements and the intent classification data. The storyboard file may include data depicting a storyboard associated with the application. The storyboard may be a series of illustrations displayed in a sequence to provide a visual representation of a functionality of the application. For example, the storyboard may include a first illustration depicting a login screen of the application, a second illustration depicting a user interface provided for display based on a user successfully logging in to the application, and/or the like.

In some implementations, the storyboard may represent the application as a set of states. Each state may be represented by one view. The storyboard may transition from one view to another view based on a user generated event. For example, the user may provide an input (e.g., select a check box depicted in a view). The storyboard may transition from a current view to a next view based on the user providing the input.

The application generation system may provide the storyboard file to the client device. The client device may receive the storyboard file from the application generation system. The client device may provide the storyboard for display based on receiving the storyboard file from the application generation system. The user may review the storyboard may provide an input to the application generation system based on reviewing the storyboard.

In some implementations, the input indicates that the user approves the storyboard. The application generation system may generate the application based on the storyboard based on the input indicating that the user approves the storyboard.

In some implementations, the input indicates one or more modifications. For example, the storyboard may depict a particular user interface. The user may desire to make a modification to the user interface based on reviewing the storyboard. The user may provide information identifying the modification to the application generation system via the client device. The application generation system may modify the user interface depicted in the storyboard based on the information identifying the modification.

As shown in FIG. 1H, and by reference number 140, the application generation system generates application code (e.g., workspace files) for the application based on the asset data, the entity data, the intent classification data, the platform-specific API layer, and the UI elements. The application generation system may obtain user interfaces, libraries, and/or reusable assets and components from a device (e.g., a third-party server, an internal memory, a server associated with the application generation system, and/or the like storing libraries, user interfaces, and/or reusable assets and components) based on the user input data. The application generation system may generate workspace files for the application based on the user interfaces, libraries, and/or reusable assets and components. The workspace file may be a file or a directory that includes the source files for the user interfaces, libraries, and/or reusable assets and components and/or symbolic links to directories that contain the build outputs (e.g., software generated based on the source code).

In some implementations, the application generation system generates the application code in standard model-view-view-model (MVVM) architecture, as described below with respect to FIG. 1M.

As shown in FIG. 1I, and by reference number 145, the application generation system generates platform-specific deployment scripts for the application based on the entity data, the intent classification data, and the application code. For example, the application generation system may generate Fastlane scripts, Jenkins scripts, and/or the like to keep application binaries deployed on various systems utilized by the application.

As shown in FIG. 1J, and by reference number 150, the application generation system generates an architecture, a resource estimate, and a project plan for the application based on the entity data, the intent classification data, and the application code. The architecture may include information identifying an application architecture associated with the application. For example, the architecture may include information identifying a hierarchical list of components, modules, and/or the like included in the application, information indicating how components of the application interact to generate an output, and/or the like. The resource estimate may include information identifying an amount of time associated with deploying the application, resources needed to deploy the application, and/or the like. For example, the resource estimate may include information identifying a quantity of devices on which the application is to be deployed, a quantity of devices required to store data associated with the application, a quantity of devices required to support an estimated number of users of the application, and/or the like. The project plan may include information identifying a goal or a purpose to the application, information indicating how the application achieves the goal or the purpose, and/or the like.

In some implementations, the application generation system provides data identifying the architecture, the resource estimate, and the project plan to the client device. The client device may receive the data identifying the architecture, the resource estimate, and the project plan and may provide the data identifying the architecture, the resource estimate, and the project plan for display to the user.

As shown in FIG. 1K, and by reference number 155, the application generation system generates platform-specific application code for different platforms based on the application code. The application generation system may determine one or more platforms on which the application is to be deployed based on the requirements document and/or the user input data. The application generation system may generate platform-specific application code for each platform on which the application is to be deployed based on the application code. In some implementations, the application generation system includes a plurality of adapters. An adapter may be configured to generate platform-specific application code for a specific platform (e.g., Android, iOs, and/or the like). The application generation system may identify one or more adapters for generating platform-specific application code for the one or more platforms on which the application is to be deployed. The application generation system may provide the application code to the identified adapters to cause the adapters to generate the platform-specific application code for the one or more platforms.

As shown in FIG. 1L, and by reference number 160, the application generation system performs one or more actions based on the platform-specific application code. In some implementations, the application generation system causes the platform-specific application code to be provided to a software development and information-technology operations (DevOps) system for testing. The DevOps system may test the application to ensure that the application meets the requirements identified in the requirements document and/or the user input data prior to the application being deployed. In this way, the application generation system may automatically provide the platform-specific application code to a DevOps system for testing thereby conserving resources that may otherwise be utilized by manually providing the platform-specific application code to the DevOps system.

In some implementations, the application generation system causes the platform-specific application code to be deployed on devices utilizing the different platforms. The application generation system identifying a device utilizing a platform identified in the requirements document and/or the user input data. The application generation system may cause the platform-specific application code associated with the platform to be deployed to the identified device. In this way, the application generation system may automatically deploy platform-specific application code to devices utilizing the corresponding platform thereby conserving resources that may otherwise be utilized by manually identifying and/or deploying the application.

In some implementations, the application generation system causes the platform-specific application code to be provided for display. For example, the application generation system may provide the platform-specific application code to the client device to cause the client device to provide the platform-specific application code for display to the user. In this way, the application generation system may enable the user to quickly and efficiently review the platform-specific application code.

In some implementations, the application generation system causes the platform-specific application code to be deployed based on the platform-specific deployment scripts. For example, the application generation system may execute the platform-specific deployment scripts to cause the platform-specific application code to be deployed on devices utilizing corresponding platforms. In this way, the application generation system may automate the application deployment process thereby conserving time and resources that may otherwise be utilized to manually deploy the platform-specific application code.

In some implementations, the application generation system provides data identifying the architecture, the resource estimate, and the project plan for display. For example, the application generation system may provide data identifying the architecture, the resource estimate, and the project plan to the client device to cause the client device to provide the architecture, the resource estimate, and the project plan for display to the user. In this way, the user may quickly and efficiently analyze the architecture, the resource estimate, and the project plan.

In some implementations, the application generation system retrains the NLU model based on the platform-specific application code. The application generation system may modify the historical data used to train the NLU model to include the requirements document, the user input data, the entity data, the intent classification data, and/or the platform-specific application code. By modifying the historical data, the application generation system may increase a quantity of observations available to train the NLU model thereby increasing a quantity of iterations that can be performed to train the NLU model. By increasing the quantity of iterations, the NLU model may provide a more accurate output.

FIG. 1M is a diagram relating to a process for generating the application code based on a MVVM architecture. When generating the application code for the application, the application generation system may generate a view, view controller classes, and storyboards for the application code based on the canvas included in the user input data. The application generation system may generate the story boards for the application code as described below with respect to FIG. 1O.

The application generation system may generate the API layer and corresponding request response models using API definitions, such as, for example, Swagger file definitions. The application generation system may generate the API layer and corresponding request response models as described below with respect to FIG. 1P.

The application generation system may generate view-model classes for the view controller classes. In some implementations, the application generation system generates view-model classes for every view-controller class. An application generation engine of the application generation system may generate interface classes and implementation of the view-model classes. The application generation engine may utilize logic to generate the interface classes and the view-model classes that is based on state, action, and functionality to transition from one state to another state. The state, action, and functionality may be determined based on an jSON definitions file, as described below.

The application generation system may generate the application code for the application based on inputs from the requirements document, the user input data, the API definitions, the view, the view controller classes, the platform-specific API layer, and the view-model classes.

FIG. 1N is a diagram relating to a process for utilizing machine learning to generate an application. As shown in FIG. 1N, a state machine is generated by a modeling engine based on inputs from a requirements document, inputs from a canvas, and API definitions. The state machine is utilized by an application generator engine to create view model classes, as described herein.

FIG. 1O is a call flow diagram relating to generating a storyboard. As shown in FIG. 1O, the user utilizes a canvas board to draw a user interface (UI) and a flow of the UI. The canvas board may read the UI and the flow of the UI and may converts the UI and the flow of the UI to a JavaScript Object Notation (jSON) tree structure.

As shown in FIG. 1O, the canvas board provides UI flow definitions to a canvas processor in a jSON format. The canvas processor may parse the UI flow definitions and may generate a jSON file that includes information describing the UI views, elements of the UI, properties of the UI, and/or the like.

As shown in FIG. 1O, the canvas processor provides the jSON file to an artifact generator. The artifact generate may resolve the platform specific plugin based on user intents determined from the requirements document, as described above. The artifact generator may provide the jSON file to a storyboard generator plugin. The storyboard generator plugin may convert the jSON file data elements into storyboard definitions. In some implementations, the storyboard generator plugin converts the jSON file data elements into XML format storyboard definitions. Additionally, the storyboard generator plugin may generate UI controller code based on the jSON file. The storyboard generator plugin may provide the storyboard definitions and the UI controller code to the canvas board to enable the user to view the storyboard as described above.

FIG. 1P is a call flow diagram relating to generating service layer code. As shown in FIG. 1P, the user uploads an API definition file that is received by a front end of the application generation system. The application generation system stores the API definition file in a memory associated with the application generation system.

As shown in FIG. 1P, the user requests a bot to generate the project. The bot receives the request and provides a command to generate the project to an application modeling engine of the application generation system. The command may include information identifying a file path of the API definition file. The application modeling engine may invoke an API processor based on receiving the command. The API processor may read the API definition file and may create an object model based on the API definition file.

As shown in FIG. 1P, the API processor may invoke an API generator plugin to generate a service layer based on creating the object model. The API generator plugin may generate code by generating request and response model files. The API generator plugin may generate the request and response model files based on definitions in the API definition file.

In some implementations, the API generator plugin may obtain predefined swift code specific API templates for RESTful API services such as GET, POST, DELETE, PUT, and/or the like. The API generator plugin may generate the request and response model files in swift class format based on definitions in the API definition file. The API generator plugin may use the templates and replace endpoints and headers in the templates based on the definitions.

As shown in FIG. 1P, the API generator plugin provides the request and response models to the project generator bot.

FIG. 1Q is a call flow diagram relating to generating a project. As shown in FIG. 1Q, a requirement use case is provided to a project generator bot. The project generator bot may extract text from the requirement use case (e.g., requirement text, as shown in FIG. 1Q) and may provide the requirement text to a NLU service. The NLU service may process the requirement text to extract intent data with entities and values (e.g., confidence scores), as described above.

As shown in FIG. 1Q, the NLU service provides the extracted intent with entities and values to the project generator bot. The project generator bot generates a logic mapping of entities based on the confidence scores, as described above.

As shown in FIG. 1Q, the project generator bot provides a generate project command to an application modeling engine. The application modeling engine receives the command and invokes or executes a script (e.g., a Ruby script). An application generator script may download components and templates associated with the project from a repository. Additionally, the application generator script may generate a project workspace and configure project settings.

FIG. 1R is a call flow diagram relating to a process for providing a list of templates and components to a user. As shown in FIG. 1R, the user uploads a requirements document that is received by a front end of the application generation system. The front end stores the requirements document in a memory of the application generation system.

As shown in FIG. 1R, the user requests a project generator bot to generate a project based on the requirements document. The project generator bot may provide the requirements document to a NLU service based on the request. The NLU service may process the requirements document to determine entity data, intent data, and confidence scores, as described above. The NLU service may provide the entity data, intent data, and confidence scores to the project generator bot.

As shown in FIG. 1R, the project generator bot fetches a template and a component list associated with the project from an external document system based on the entity data, the intent data, and the confidence scores. As shown, the external document system provides a list of templates and components to the project generator bot. The list of templates and components may be associated with a platform associated with the project and/or identified in the requirements document, as described above. The project generator bot may receive the list and may provide the list to the user.

As indicated above, FIGS. 1A-1R are provided as an example. Other examples may differ from what is described with regard to FIGS. 1A-1R. The number and arrangement of devices shown in FIGS. 1A-1R are provided as an example. In practice, there may be additional devices, fewer devices, different devices, or differently arranged than those shown in FIGS. 1A-1R. Furthermore, two or more devices shown in FIGS. 1A-1R may be implemented within a single device, or a single device shown in FIGS. 1A-1R may be implemented as multiple, distributed devices. Additionally, or alternatively, a set of devices (e.g., one or more devices) shown in FIGS. 1A-1R may perform one or more functions described as being performed by another set of devices shown in FIGS. 1A-1R.

Figure 2:
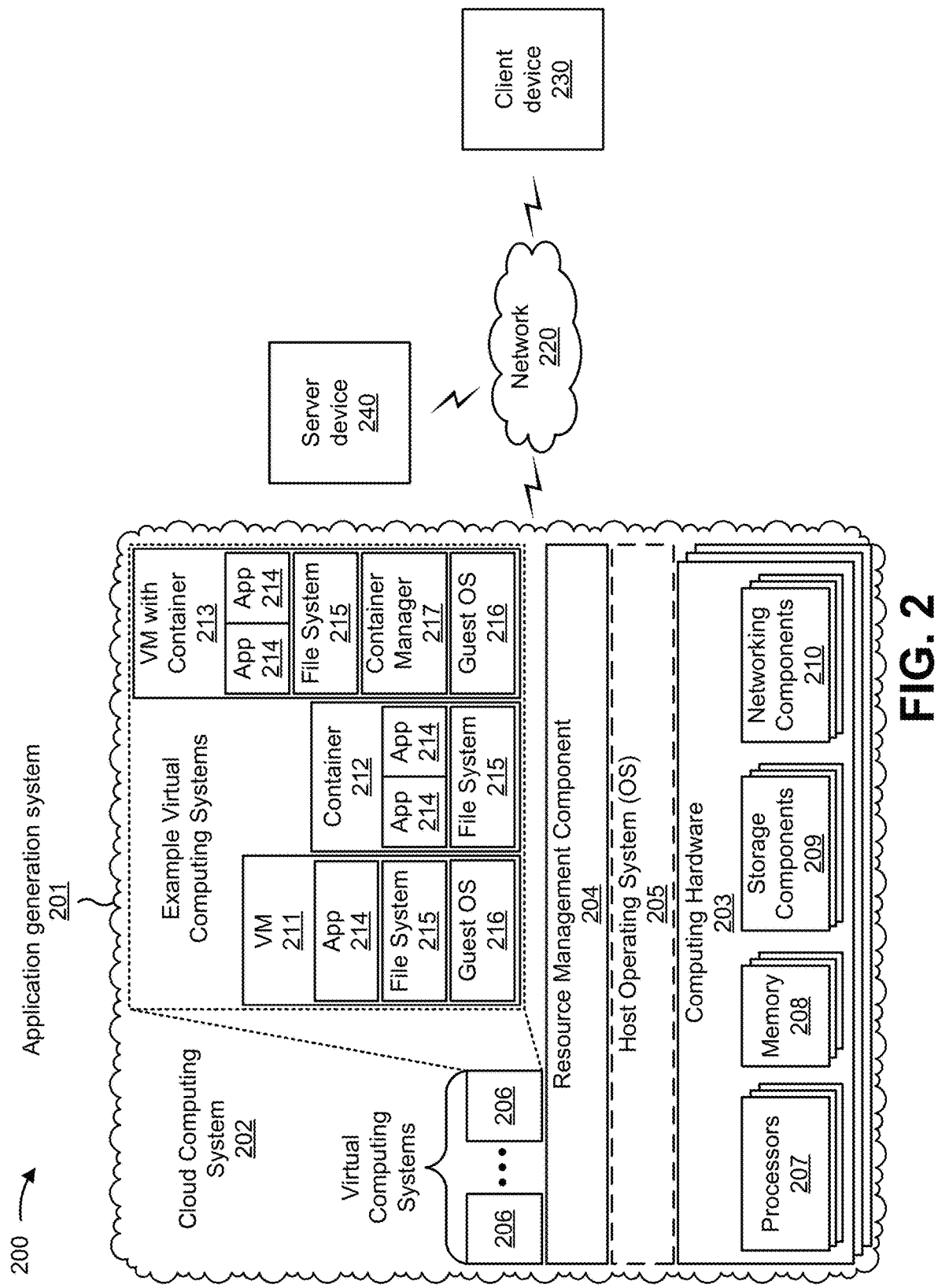
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an application generation system 201. The application generation system 201 may include one or more elements of a cloud computing system 202 and/or may execute within the cloud computing system 202 (e.g., as one or more virtual computing systems 206). The cloud computing system 202 may include one or more elements 203-217, as described in more detail below. As further shown in FIG. 2, environment 200 may include a network 220, a client device 230, and/or a server device 240. Devices of environment 200 may interconnect via wired connections, wireless connections, or a combination of wired and wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using such virtualization, the resource management component 204 enables a single computing device (e.g., a computer, a server, a host device, and/or the like) to operate as if the single computing device were multiple computing devices, such as by creating multiple isolated virtual computing systems 206 from computing hardware 203 of the single computing device.

Computing hardware 203 includes hardware and corresponding resources from one or more computing devices. For example, computing hardware 203 may include hardware from a single computing device (e.g., a single server or host device) or from multiple computing devices (e.g., multiple servers or host devices), such as multiple computing devices in one or more data centers, server farms, server pools, and/or the like. As shown, computing hardware 203 may include one or more processors 207, one or more memories 208, one or more storage components 209, and/or one or more networking components 210. Computing hardware 203 may be interconnected via one or more wired and/or wireless buses, which may interconnect computing hardware 203 within a single computing device and/or across multiple computing devices.

A processor 207 includes a central processing unit, a graphics processing unit, and/or the like. A memory 208 includes random-access memory, read-only memory, and/or the like. The memory 208 may store a set of instructions (e.g., one or more instructions) for execution by the processor 207. The processor 207 may execute the set of instructions to perform one or more operations or processes described herein. In some implementations, execution of the set of instructions, by one or more processors 207, causes the one or more processors 207 and/or the application generation system 201 to perform one or more operations or processes described herein. A storage component 209 includes a hard disk or another type of storage device that stores information, data, and/or software (e.g., code, instructions, and/or the like) related to the operation and use of the application generation system 201. In some implementations, memory 208 and/or storage component 209 is/are implemented as a non-transitory computer readable medium. A networking component 210 includes a network interface and corresponding hardware that enables the application generation system 201 to communicate with other devices of environment 200 via a wired connection and/or a wireless connection, such as via network 220.

The resource management component 204 includes a virtualization application (e.g., executing on hardware, such as computing hardware 203) capable of virtualizing computing hardware 203 to start (e.g., create or spin up), stop (e.g., delete or tear down), and/or manage one or more virtual computing systems 206. The resource management component 204 may control access to and/or use of computing hardware 203 and/or software executing on computing hardware 203. The resource management component 204 may include a hypervisor or a virtual machine monitor, such as when the virtual computing systems 206 are virtual machines 211. Additionally, or alternatively, the resource management component 204 may include a container manager, such as when the virtual computing systems 206 are containers 212.

In some implementations, the resource management component 204 executes within and/or in coordination with a host operating system 205. For example, the resource management component 204 may execute on top of the host operating system 205 rather than interacting directly with computing hardware 203, such as when the resource management component 204 is a hosted hypervisor (e.g., a Type 2 hypervisor) or a container manager. In this case, the host operating system 205 may control access to and/or use of computing hardware 203 and/or software executing on computing hardware 203 based on information and/or instructions received from the resource management component 204. Alternatively, the resource management component 204 may interact directly with computing hardware 203 rather than interacting with the host operating system 205, such as when the resource management component 204 is a bare-metal hypervisor (e.g., a Type 1 hypervisor). Thus, in some implementations, the cloud computing system 202 does not include a host operating system 205. In some implementations, the host operating system 205 includes and/or executes an administrator application to enable a system administrator to manage, customize, and/or configure cloud computing system 202.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications 214 using a file system 215. The file system 215 may include binary files, software libraries, and/or other resources required to execute applications 214 on a guest operating system 216 or the host operating system 205. In some implementations, a virtual computing system 206 (e.g., a virtual machine 211 or a hybrid environment 213) includes a guest operating system 216. In some implementations, a virtual computing system 206 (e.g., a container 212 or a hybrid environment 213) includes a container manager 217.

A virtual machine 211 is an emulation of a computing device that enables execution of separate, isolated instances of virtual computing devices (e.g., multiple virtual machines 211) on the same computing hardware 203. The guest operating systems 216 and applications 214 of multiple virtual machines 211 may share computing hardware 203 from a single computing device or from multiple computing devices (e.g., a pool of computing devices). Each separate virtual machine 211 may include a guest operating system 216, a file system 215, and one or more applications 214.

With a virtual machine 211, the underlying computing hardware 203 is virtualized, and the guest operating system 216 executes on top of this virtualized hardware. Using virtual machines 211 enables different types of guest operating systems 216 to execute on the same computing hardware 203 in an isolated environment, but with more resource usage and overhead than containers 212.

Unlike a virtual machine 211, a container 212 virtualizes a host operating system 205 rather than the underlying computing hardware 203. Thus, a container 212 does not require a guest operating system 216 because the application(s) 214 included in the container 212 execute directly on the host operating system 205 using a file system 215 included in the container 212. Each separate container 212 may share the kernel of the host operating system 205, and different applications 214 within a single container 212 may share a file system 215. This sharing of a file system 215 among multiple applications 214 reduces the need to reproduce operating system code for different applications, and enables a single host operating system 205 to execute multiple applications 214 and/or containers 212. As a result, containers 212 enable a greater quantity of applications 214 to execute on a smaller quantity of computing devices as compared to virtual machines 211.

A hybrid environment 213 includes elements of a virtual machine 211 and a container 212. For example, a hybrid environment 213 may include a guest operating system 216 that executes on top of virtualized hardware. A container manager 217 may execute on top of the guest operating system 216 to start, stop, and/or manage one or more containers within the hybrid environment 213. Using a hybrid environment 213 enables different types of guest operating systems 216 to execute on the same computing hardware 203 in an isolated environment, while also enabling lightweight containers to execute on top of the guest operating system 216.

The quantity of applications 214 shown in FIG. 2 as executing within each virtual computing system 206 is shown as an example, and a different quantity of applications 214 may execute within each virtual computing system. Furthermore, although the application generation system 201 may include one or more elements 203-217 of the cloud computing system 202, may execute within the cloud computing system 202, and/or may be hosted within the cloud computing system 202, in some implementations, the application generation system 201 may not be cloud-based (e.g., may be implemented outside of a cloud computing system) or may be partially cloud-based. For example, the application generation system 201 may include one or more devices that are not part of the cloud computing system 202, which may include a standalone server or another type of computing device. The application generation system 201 may perform one or more operations and/or processes described in more detail elsewhere herein.

Network 220 includes one or more wired and/or wireless networks. For example, network 220 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 220 enables communication among the devices of environment 200.

Client device 230 includes one or more devices capable of receiving, generating, storing, processing, and/or providing information associated with generating an application, as described elsewhere herein. Client device 230 may include a communication device and/or a computing device. For example, client device 230 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. Client device 230 may communicate with one or more other devices of environment 200, as described elsewhere herein. Client device 230 may include one or more processors (e.g., similar to processor 207), one or more memories (e.g., similar to memory 208), one or more storage components (e.g., similar to storage component 209), one or more networking components (e.g., similar to networking component 210), and/or the like.

Server device 240 includes one or more devices capable of receiving, generating, storing, processing, providing, and/or routing information associated with generating an application, as described elsewhere herein. Server device 240 may include a communication device and/or a computing device. For example, server device 240 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Server device 240 may communicate with one or more other devices of environment 200, as described elsewhere herein. Server device 240 may include one or more processors (e.g., similar to processor 207), one or more memories (e.g., similar to memory 208), one or more storage components (e.g., similar to storage component 209), one or more networking components (e.g., similar to networking component 210), and/or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
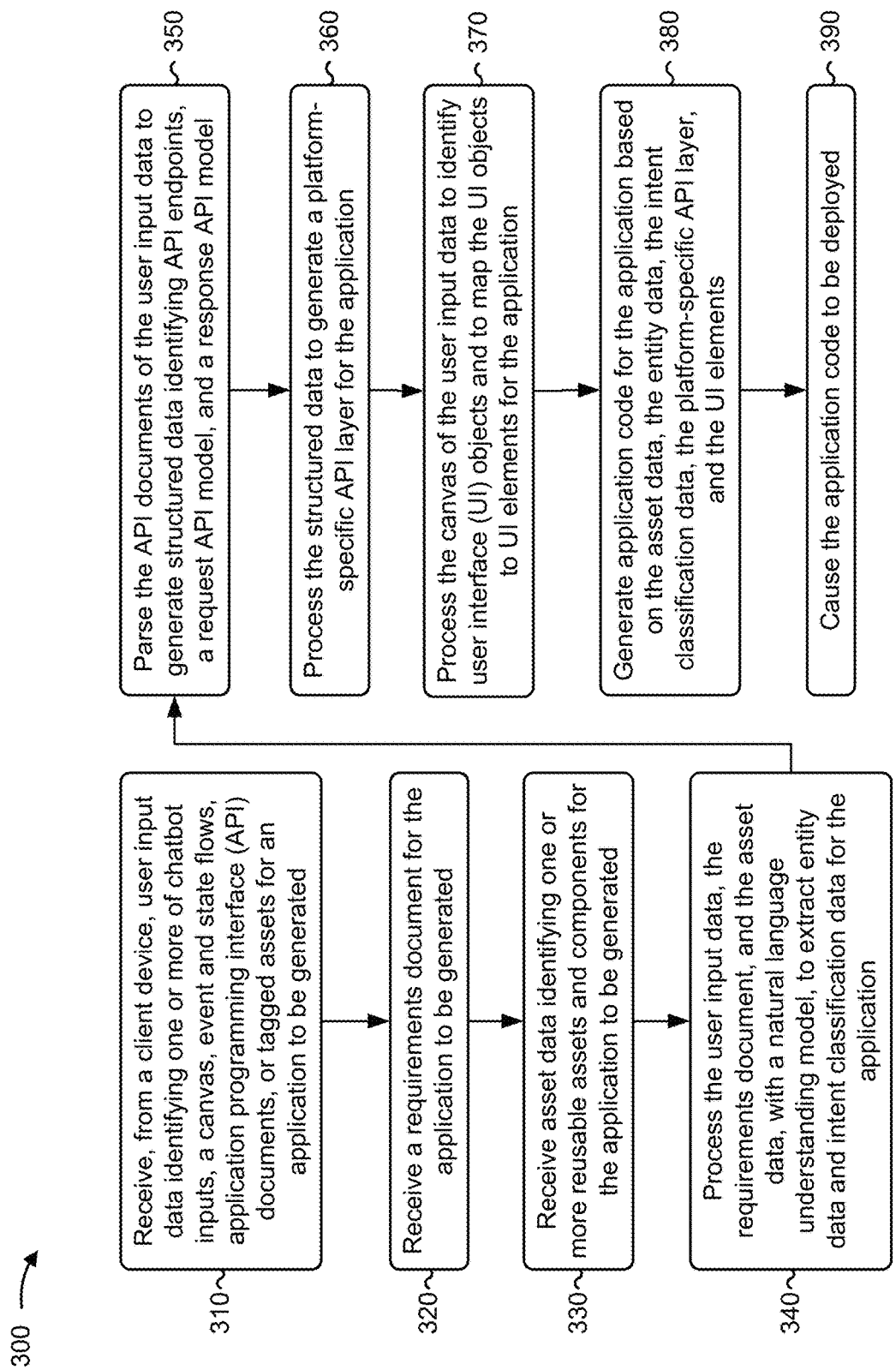
FIG. 3 is a flow chart of example processes relating to generating an application.

FIG. 3 is a flow chart of an example process 300 associated with utilizing natural language understanding and machine learning to generate an application. In some implementations, one or more process blocks of FIG. 3 may be performed by a device (e.g., application generation system 201). In some implementations, one or more process blocks of FIG. 3 may be performed by another device or a group of devices separate from or including the device, such as a client device (e.g., client device 230), a server device (e.g., server device 240), and/or the like. Additionally, or alternatively, one or more process blocks of FIG. 3 may be performed by one or more components of a device, such as processor 207, memory 208, storage component 209, networking component 210, and/or the like.

As shown in FIG. 3, process 300 may include receiving, from a client device, user input data identifying one or more of chatbot inputs, a canvas, event and state flows, application programming interface (API) documents, or tagged assets for an application to be generated (block 310). For example, the device may receive, from a client device, user input data identifying one or more of chatbot inputs, a canvas, event and state flows, application programming interface (API) documents, or tagged assets for an application to be generated, as described above.

As further shown in FIG. 3, process 300 may include receiving a requirements document for the application to be generated (block 320). For example, the device may receive a requirements document for the application to be generated, as described above.

As further shown in FIG. 3, process 300 may include receiving asset data identifying one or more reusable assets and components for the application to be generated (block 330). For example, the device may receive asset data identifying one or more reusable assets and components for the application to be generated, as described above.

As further shown in FIG. 3, process 300 may include processing the user input data, the requirements document, and the asset data, with a natural language understanding model, to extract entity data and intent classification data for the application (block 340). For example, the device may process the user input data, the requirements document, and the asset data, with a natural language understanding model, to extract entity data and intent classification data for the application, as described above.

As further shown in FIG. 3, process 300 may include parsing the API documents of the user input data to generate structured data identifying API endpoints, a request API model, and a response API model (block 350). For example, the device may parse the API documents of the user input data to generate structured data identifying API endpoints, a request API model, and a response API model, as described above.

As further shown in FIG. 3, process 300 may include processing the structured data to generate a platform-specific API layer for the application (block 360). For example, the device may process the structured data to generate a platform-specific API layer for the application, as described above.

As further shown in FIG. 3, process 300 may include processing the canvas of the user input data to identify user interface (UI) objects and to map the UI objects to UI elements for the application (block 370). For example, the device may process the canvas of the user input data to identify user interface (UI) objects and to map the UI objects to UI elements for the application, as described above.

As further shown in FIG. 3, process 300 may include generating application code for the application based on the asset data, the entity data, the intent classification data, the platform-specific API layer, and the UI elements (block 380). For example, the device may generate application code for the application based on the asset data, the entity data, the intent classification data, the platform-specific API layer, and the UI elements, as described above.

As further shown in FIG. 3, process 300 may include causing the application code to be deployed (block 390). For example, the device may cause the application code to be deployed, as described above.

Process 300 may include additional implementations, such as any single implementation or any combination of implementations described below and/or in connection with one or more other processes described elsewhere herein.

In a first implementation, process 300 includes generating platform-specific deployment scripts for the application based on the entity data, the intent classification data, and the application code; generating platform-specific application code for different platforms based on the application code; and performing one or more actions based on the platform-specific application code.

In a second implementation, alone or in combination with the first implementation, performing the one or more actions comprises one or more of: causing the platform-specific application code to be provided to a software development and information-technology operations system for testing; causing the platform-specific application code to be deployed on devices utilizing the different platforms; or causing the platform-specific application code to be provided for display.

In a third implementation, alone or in combination with one or more of the first and second implementations, performing the one or more actions comprises one or more of: causing the platform-specific application code to be deployed based on the platform-specific deployment scripts; or retraining the natural language understanding model based on the platform-specific application code.

In a fourth implementation, alone or in combination with one or more of the first through third implementations, process 300 includes generating an architecture, a resource estimate, and a project plan for the application based on the entity data, the intent classification data, and the application code; and providing, for display, data identifying the architecture, the resource estimate, and the project plan.

In a fifth implementation, alone or in combination with one or more of the first through fourth implementations, the natural language understanding model includes a machine learning model.

In a sixth implementation, alone or in combination with one or more of the first through fifth implementations, processing the user input data, the requirements document, and the asset data, with the natural language understanding model, to extract the entity data and the intent classification data for the application comprises: determining confidence scores associated with the entity data and the intent classification data, the confidence scores are utilized to generate the application code.

In a seventh implementation, alone or in combination with one or more of the first through sixth implementations, process 300 includes generating a view and view controller classes for the application code based on the canvas included in the user input data; generating view-model classes for the view controller classes; and generating the application code for the application based on the view, the view controller classes, the platform-specific API layer, and the view-model classes.

In an eighth implementation, alone or in combination with one or more of the first through seventh implementations, process 300 includes creating a state machine based on the canvas, the requirements document, and the API documents; modifying the state machine based on feedback and to generate a modified state machine; and generating view-model classes for the view controller classes based on the modified state machine.

In a ninth implementation, alone or in combination with one or more of the first through eighth implementations, process 300 includes providing, to the client device and via a chatbot interface, a request for inputs associated with the application; and receiving, from the client device and via the chatbot interface, the chatbot inputs in response to the request.

In a tenth implementation, alone or in combination with one or more of the first through ninth implementations, process 300 includes generating a storyboard file for the application based on the UI elements and the intent classification data; and providing the storyboard file for display.

In an eleventh implementation, alone or in combination with one or more of the first through tenth implementations, process 300 includes parsing the requirements document to identify the application to be generated; determining the one or more reusable assets and components for the application based on the parsed requirements document; and retrieving the one or more reusable assets and components from a data structure that includes a plurality of reusable assets and components for a plurality of platforms.

In a twelfth implementation, alone or in combination with one or more of the first through eleventh implementations, process 300 includes generating script files for the application code based on the asset data, the entity data, the intent classification data, the platform-specific API layer, and the UI elements, wherein the script is filing are to support continuous integration tools for the application code.

In a thirteenth implementation, alone or in combination with one or more of the first through twelfth implementations, process 300 includes causing the platform-specific application code to be provided to a software development and information-technology operations system for testing; causing the platform-specific application code to be deployed on devices utilizing the different platforms based on the platform-specific deployment scripts; causing the platform-specific application code to be provided for display; or retraining the natural language understanding model based on the platform-specific application code.

In a fourteenth implementation, alone or in combination with one or more of the first through twelfth implementations, process 300 includes generating an architecture, a resource estimate, and a project plan for the application based on the entity data, the intent classification data, and the application code; and providing, for display, data identifying the architecture, the resource estimate, and the project plan.

In a fifteenth implementation, alone or in combination with one or more of the first through fourteenth implementations, process 300 includes generating a view and view controller classes for the application code based on the canvas included in the user input data; generating view-model classes for the view controller classes; and generating the application code for the application based on the view, the view controller classes, the platform-specific API layer, and the view-model classes.

In a sixteenth implementation, alone or in combination with one or more of the first through fifteenth implementations, process 300 includes providing, to the client device and via a chatbot interface, a request for inputs associated with the application; and receiving, from the client device and via the chatbot interface, the chatbot inputs in response to the request.

In a seventeenth implementation, alone or in combination with one or more of the first through sixteenth implementations, process 300 includes generating a storyboard file for the application based on the UI elements and the intent classification data; and providing the storyboard file for display.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device and from a client device, user input data identifying one or more of chatbot inputs, a canvas, event and state flows, application programming interface (API) documents, or tagged assets associated with an application;
   receiving, by the device, a requirements document associated with the application;
   receiving, by the device, asset data identifying one or more reusable assets and components associated with the application;
   processing, by the device, the user input data, the requirements document, and the asset data, with a natural language understanding model, to extract entity data and intent classification data associated with the application,
      wherein the entity data and the intent classification data is used to generate an application architecture associated with the application;
   parsing, by the device and by invoking an API, the API documents of the user input data to generate structured data identifying API endpoints, a request API model, and a response API model;
   processing, by the device, the structured data to generate a platform-specific API layer associated with the application;
   processing, by the device, the canvas of the user input data to identify user interface (UI) objects and to map the UI objects to UI elements associated with the application;
   generating, by the device, application code for the application based on the asset data, the entity data, the intent classification data, the platform-specific API layer, and the UI elements;
   generating, by the device, platform-specific application code for different platforms based on the application code; and
   causing, by the device, the application code to be deployed.

2. The method of claim 1, further comprising:
   generating platform-specific deployment scripts for the application based on the entity data, the intent classification data, and the application code; and
   performing one or more actions based on the platform-specific application code.

3. The method of claim 2, wherein performing the one or more actions comprises one or more of:
   causing the platform-specific application code to be provided to a software development and information-technology operations system for testing;
   causing the platform-specific application code to be deployed on devices utilizing the different platforms; or
   causing the platform-specific application code to be provided for display.

4. The method of claim 2, wherein performing the one or more actions comprises one or more of:
  causing the platform-specific application code to be deployed based on the platform-specific deployment scripts; or
  retraining the natural language understanding model based on the platform-specific application code.

5. The method of claim 1, further comprising:
  generating the application architecture, a resource estimate, and a project plan for the application based on the entity data, the intent classification data, and the application code; and
  providing, for display, data identifying the application architecture, the resource estimate, and the project plan.

6. The method of claim 1, wherein the natural language understanding model includes a machine learning model.

7. The method of claim 1, wherein processing the user input data, the requirements document, and the asset data, with the natural language understanding model, to extract the entity data and the intent classification data for the application comprises:
  determining confidence scores associated with the entity data and the intent classification data,
    wherein the confidence scores indicate a probability that the entity data and the intent classification data correspond to information included in the requirements document, and
    wherein the confidence scores are utilized to generate the application code.

8. A device, comprising:
  one or more memories; and
  one or more processors, communicatively coupled to the one or more memories, configured to:
    receive, from a client device, user input data identifying one or more of chatbot inputs, a canvas, event and state flows, application programming interface (API) documents, or tagged assets associated with an application;
    receive a requirements document associated with the application;
    receive asset data identifying one or more reusable assets and components associated with the application;
    process, by invoking an API, the user input data, the requirements document, and the asset data, with a natural language understanding model, to extract entity data and intent classification data for the application,
      wherein the entity data and the intent classification data is used to generate an application architecture associated with the application;
    parse the API documents of the user input data to generate structured data identifying API endpoints, a request API model, and a response API model;
    process the structured data to generate a platform-specific API layer associated with the application;
    process the canvas of the user input data to identify user interface (UI) objects and to map the UI objects to UI elements associated with the application;
    generate application code for the application based on the asset data, the entity data, the intent classification data, the platform-specific API layer, and the UI elements;
    generate platform-specific application code for different platforms based on the application code; and
    cause the platform-specific application code to be implemented on the different platforms.

9. The device of claim 8, wherein the one or more processors, when generating the application code for the application, are configured to:
  generate a view and view controller classes for the application code based on the canvas included in the user input data;
  generate view-model classes for the view controller classes; and
  generate the application code for the application based on the view, the view controller classes, the platform-specific API layer, and the view-model classes.

10. The device of claim 9, wherein the one or more processors, when generating the view-model classes, are configured to:
  create a state machine based on the canvas, the requirements document, and the API documents;
  modify the state machine based on feedback and to generate a modified state machine; and
  generate the view-model classes for the view controller classes based on the modified state machine.

11. The device of claim 8, wherein the one or more processors are further configured to:
  provide, to the client device and via a chatbot interface, a request for inputs associated with the application; and
  receive, from the client device and via the chatbot interface, chatbot inputs in response to the request.

12. The device of claim 8, wherein the one or more processors are further configured to:
  generate a storyboard file for the application based on the UI elements and the intent classification data; and
  provide the storyboard file for display.

13. The device of claim 8, wherein the one or more processors, when receiving the asset data, are configured to:
  parse the requirements document to identify the application;
  determine the one or more reusable assets and components for the application based on the parsed requirements document; and
  retrieve the one or more reusable assets and components from a data structure that includes a plurality of reusable assets and components for a plurality of platforms.

14. The device of claim 8, wherein the one or more processors are further configured to:
  generate script files for the application code based on the asset data, the entity data, the intent classification data, the platform-specific API layer, and the UI elements,
    wherein the script files are to support continuous integration tools for the application code.

15. A non-transitory computer-readable medium storing instructions, the instructions comprising:
  one or more instructions that, when executed by one or more processors, cause the one or more processors to:
    receive, from a client device, user input data identifying one or more of chatbot inputs, a canvas, event and state flows, application programming interface (API) documents, or tagged assets associated with an application;
    receive a requirements document associated with the application;
    receive asset data identifying one or more reusable assets and components associated with the application;
    process the user input data, the requirements document, and the asset data, with a natural language understanding model, to extract entity data and intent classification data associated with the application, wherein the entity data and the intent classification data is used to generate an application architecture associated with the application;

parse, by invoking an API, the API documents of the user input data to generate structured data identifying API endpoints, a request API model, and a response API model;

process the structured data to generate a platform-specific API layer for the application;

process the canvas of the user input data to identify user interface (UI) objects and to map the UI objects to UI elements associated with the application;

generate application code for the application based on the asset data, the entity data, the intent classification data, the platform-specific API layer, and the UI elements;

generate platform-specific deployment scripts for the application based on the entity data, the intent classification data, and the application code;

generate platform-specific application code for different platforms based on the application code; and perform one or more actions based on the platform-specific application code.

16. The non-transitory computer-readable medium of claim 15, wherein the one or more instructions, that cause the one or more processors to perform the one or more actions, cause the one or more processors to one or more of:

cause the platform-specific application code to be provided to a software development and information-technology operations system for testing;

cause the platform-specific application code to be deployed on devices utilizing the different platforms based on the platform-specific deployment scripts;

cause the platform-specific application code to be provided for display; or retrain the natural language understanding model based on the platform-specific application code.

17. The non-transitory computer-readable medium of claim 15, wherein the one or more instructions, when executed by the one or more processors, further cause the one or more processors to:

generate the application architecture, a resource estimate, and a project plan for the application based on the entity data, the intent classification data, and the application code; and provide, for display, data identifying the application architecture, the resource estimate, and the project plan.

18. The non-transitory computer-readable medium of claim 15, wherein the one or more instructions, that cause the one or more processors to generate the application code for the application, cause the one or more processors to:

generate a view and view controller classes for the application code based on the canvas included in the user input data;

generate view-model classes for the view controller classes; and generate the application code for the application based on the view, the view controller classes, the platform-specific API layer, and the view-model classes.

19. The non-transitory computer-readable medium of claim 15, wherein the one or more instructions, when executed by the one or more processors, further cause the one or more processors to:

provide, to the client device and via a chatbot interface, a request for inputs associated with the application; and receive, from the client device and via the chatbot interface, chatbot inputs in response to the request.

20. The non-transitory computer-readable medium of claim 15, wherein the one or more instructions, when executed by the one or more processors, further cause the one or more processors to:

generate a storyboard file for the application based on the UI elements and the intent classification data; and provide the storyboard file for display.

* * * * *